March 9, 1971 W. P. HIDDEN ET AL 3,568,274
APPARATUS FOR MAKING PRESTRESSED CONCRETE MEMBERS
Filed April 16, 1968 17 Sheets-Sheet 1
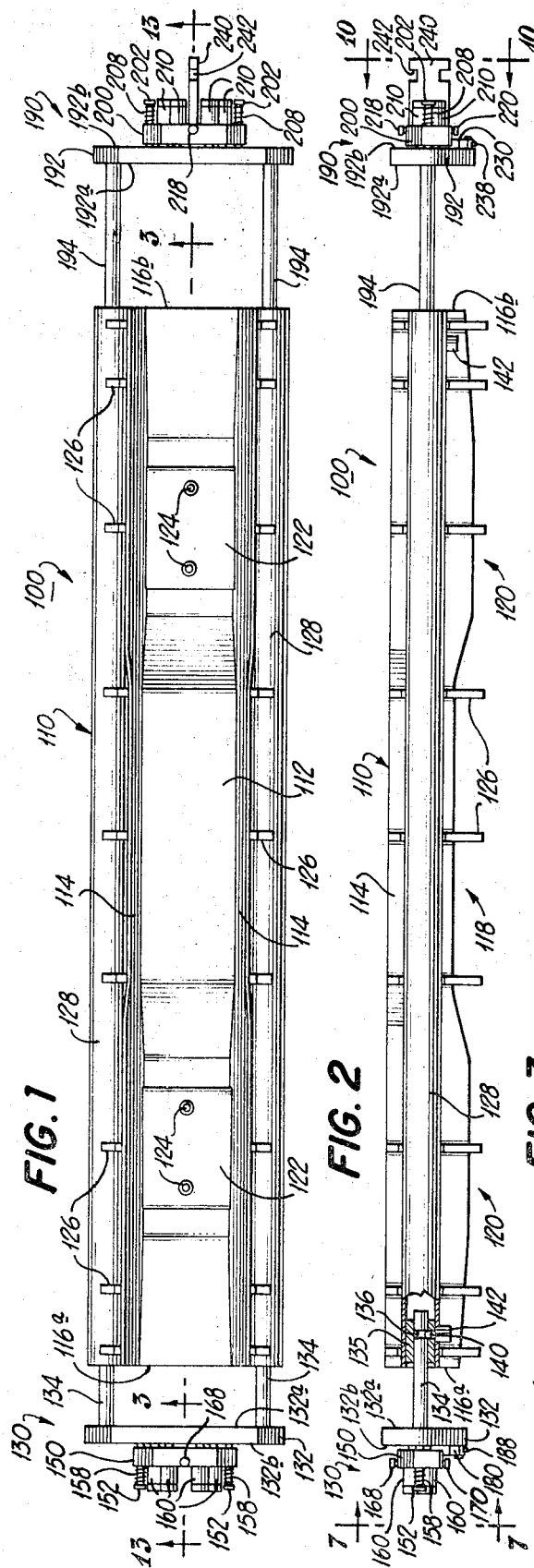
Inventors
WILLIAM P. HIDDEN and
ROBERT S. YETMAN
by
Hume, Clement, Hume and Lee
Att'ys.

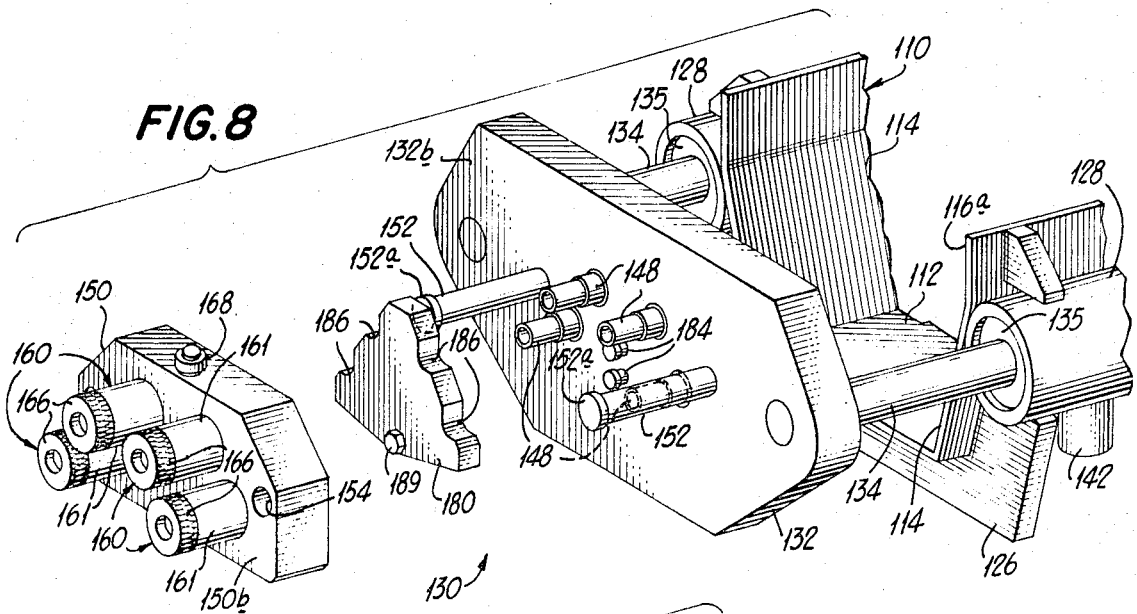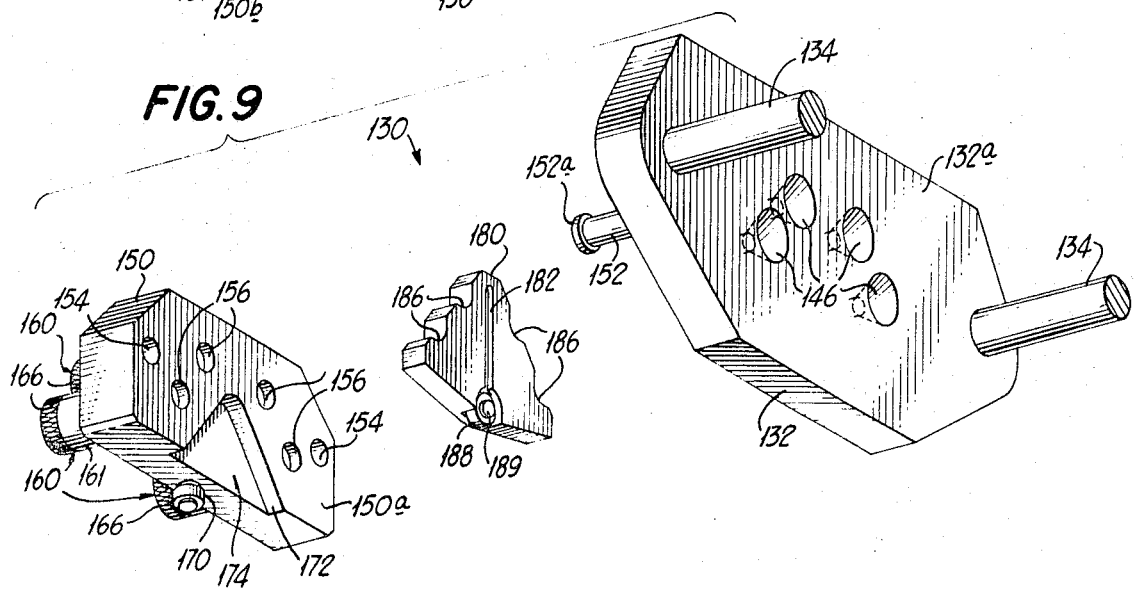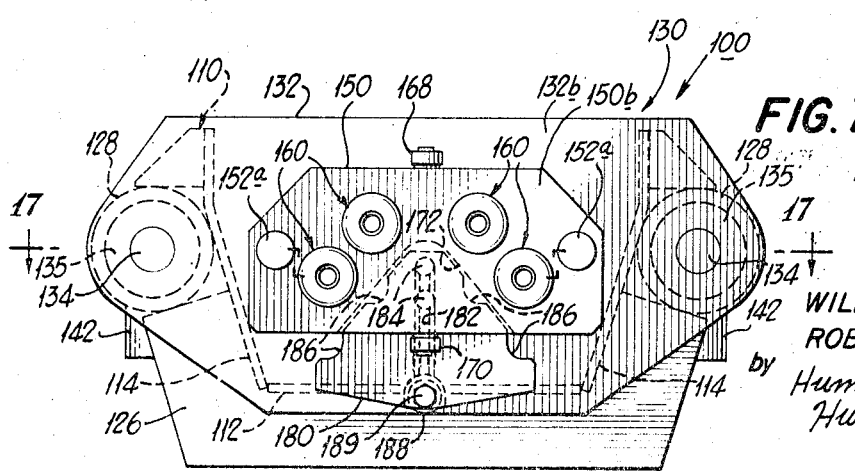

March 9, 1971 W. P. HIDDEN ET AL 3,568,274
APPARATUS FOR MAKING PRESTRESSED CONCRETE MEMBERS
Filed April 16, 1968 17 Sheets-Sheet 3

Inventors
WILLIAM P. HIDDEN and
ROBERT S. YETMAN
by Hume, Clement, Hume and Lee
Att'ys.

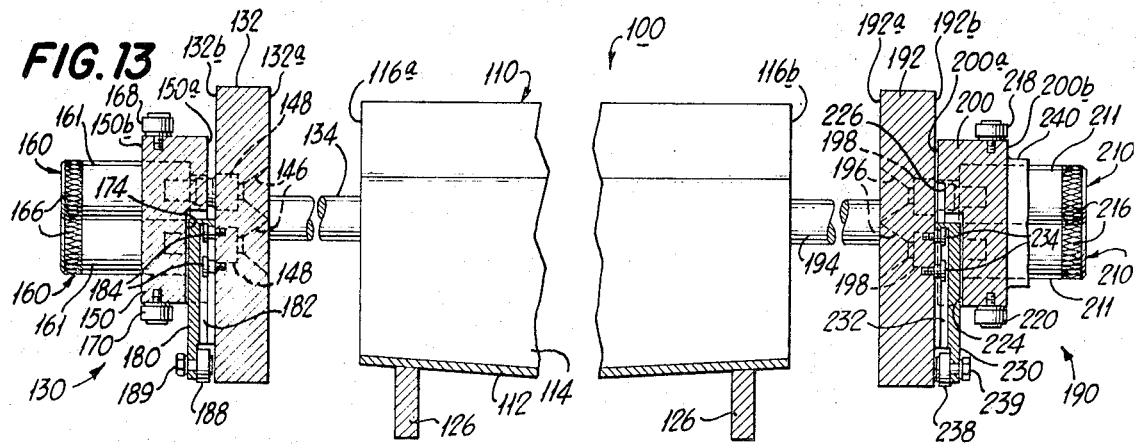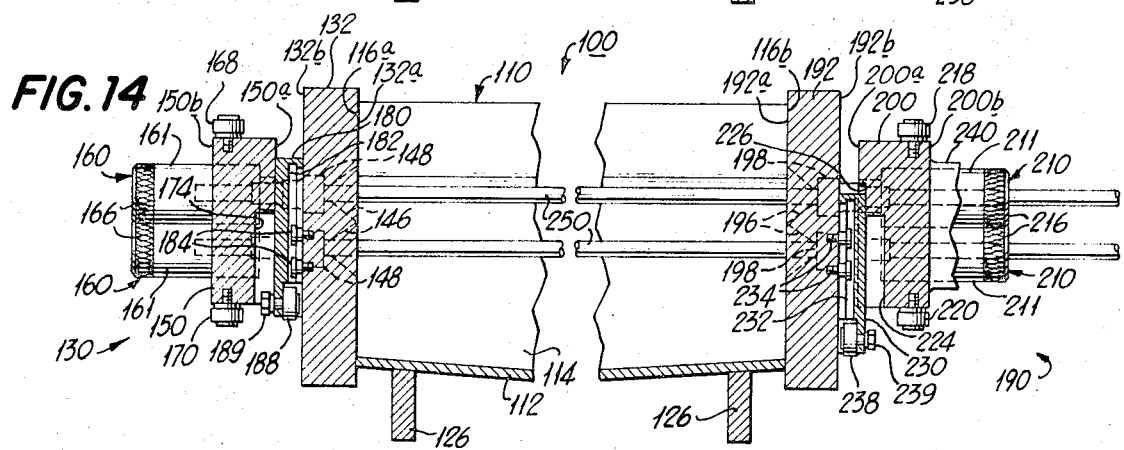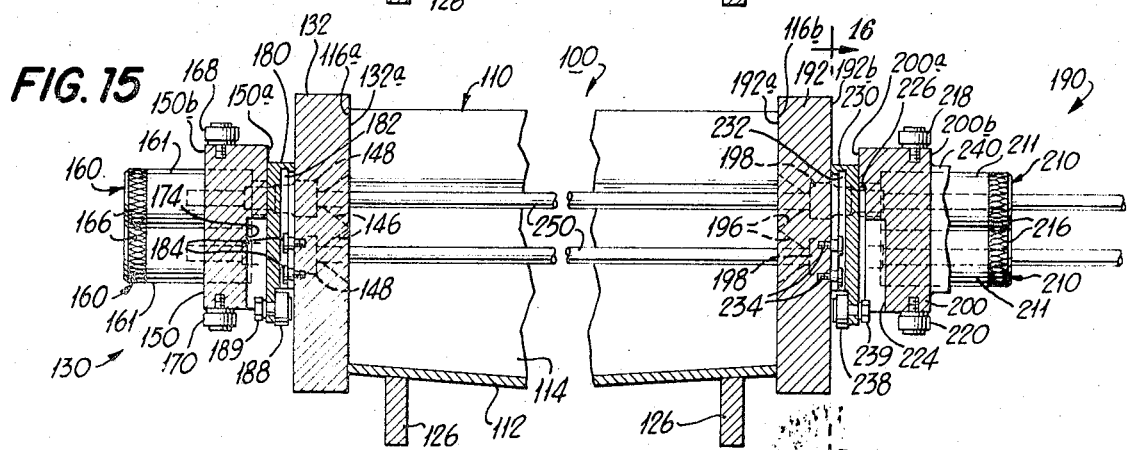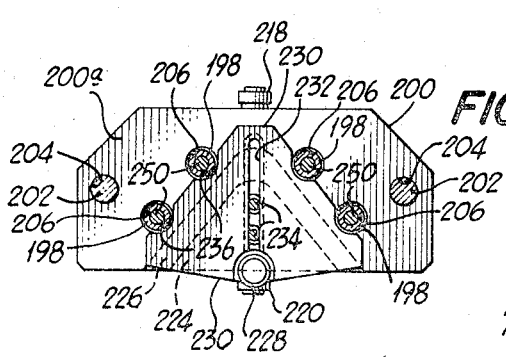

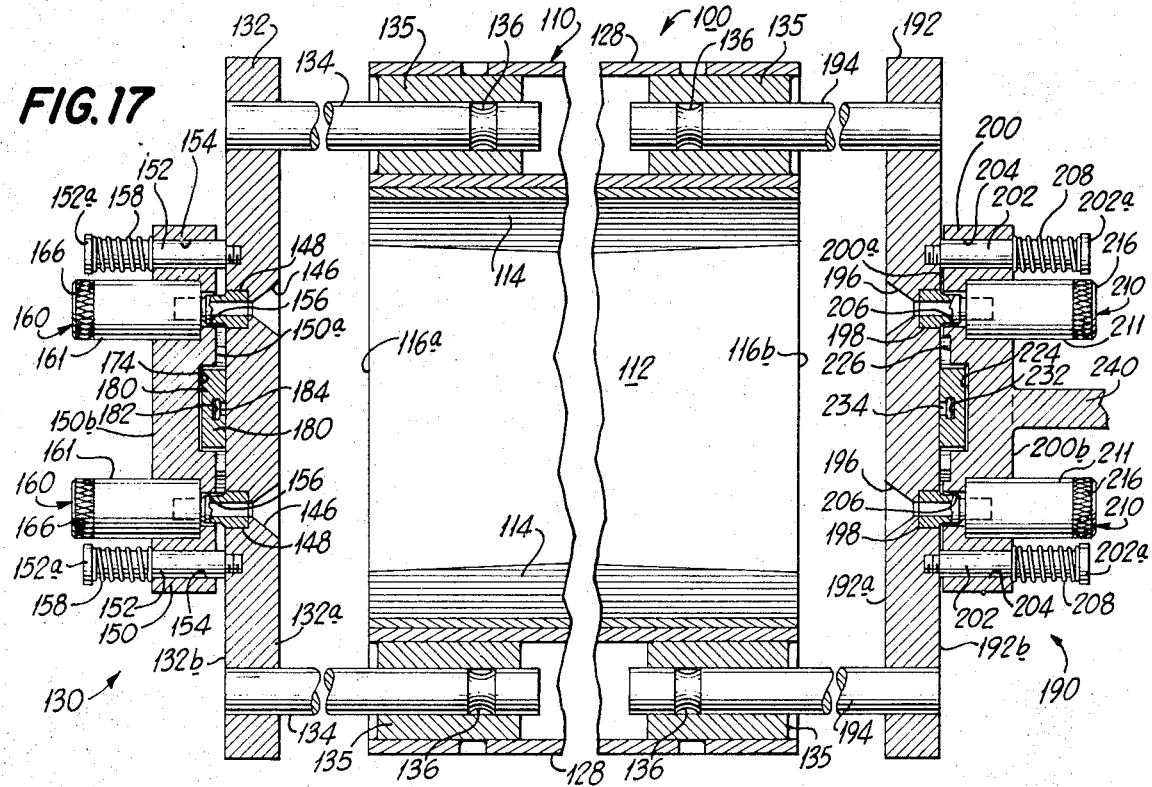
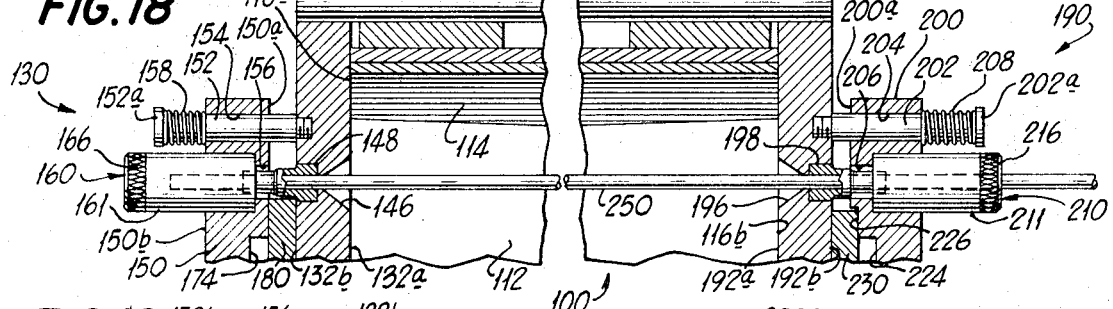
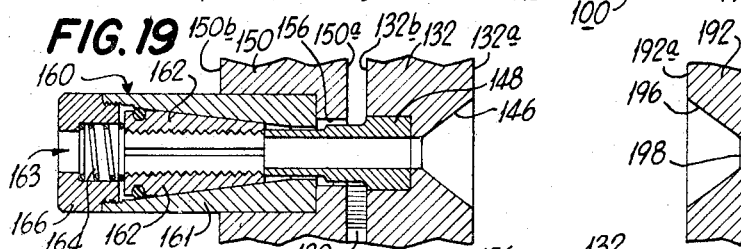
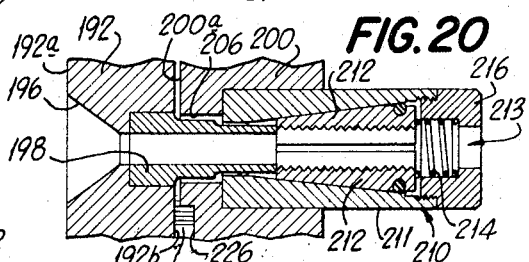

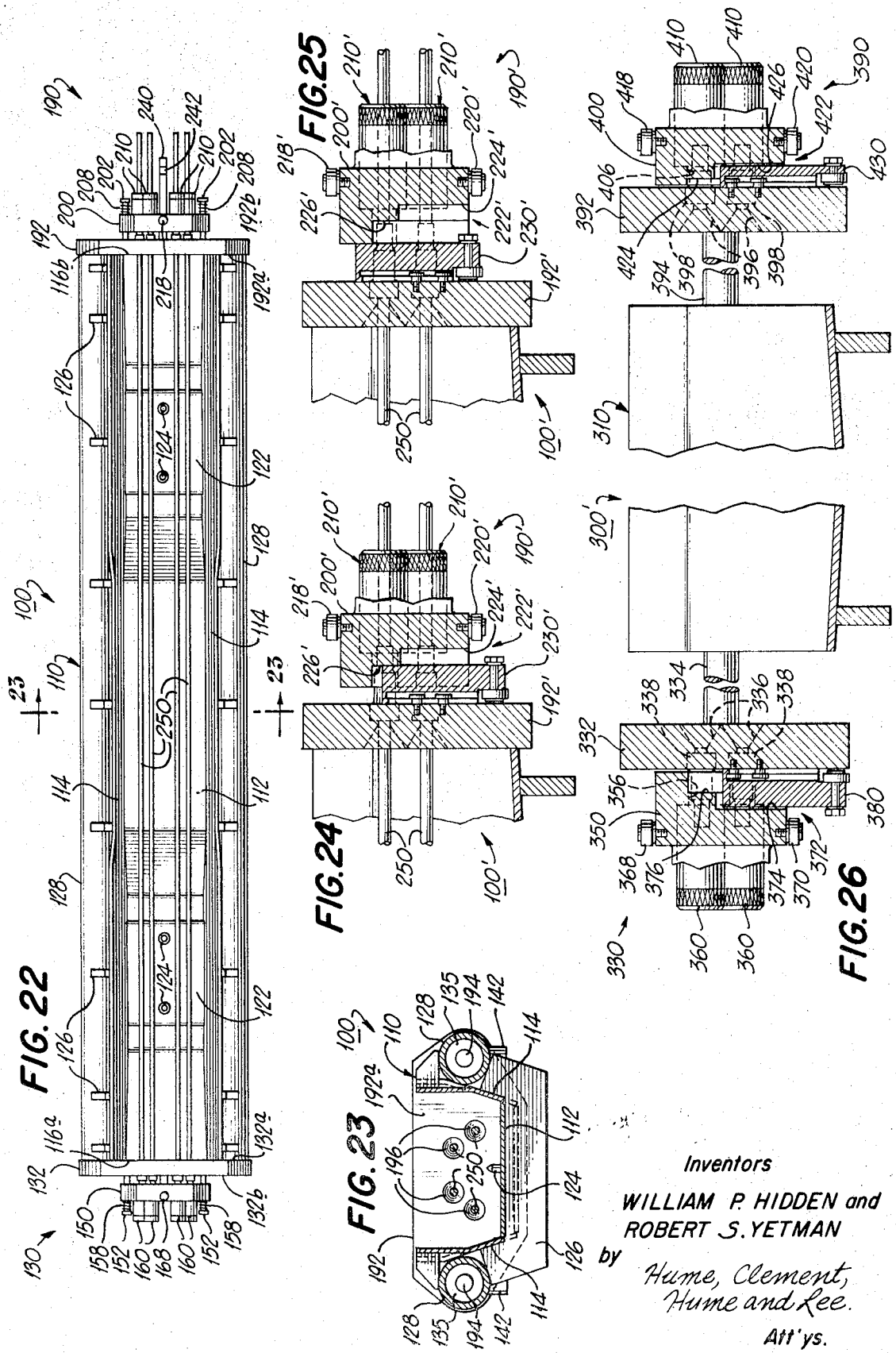

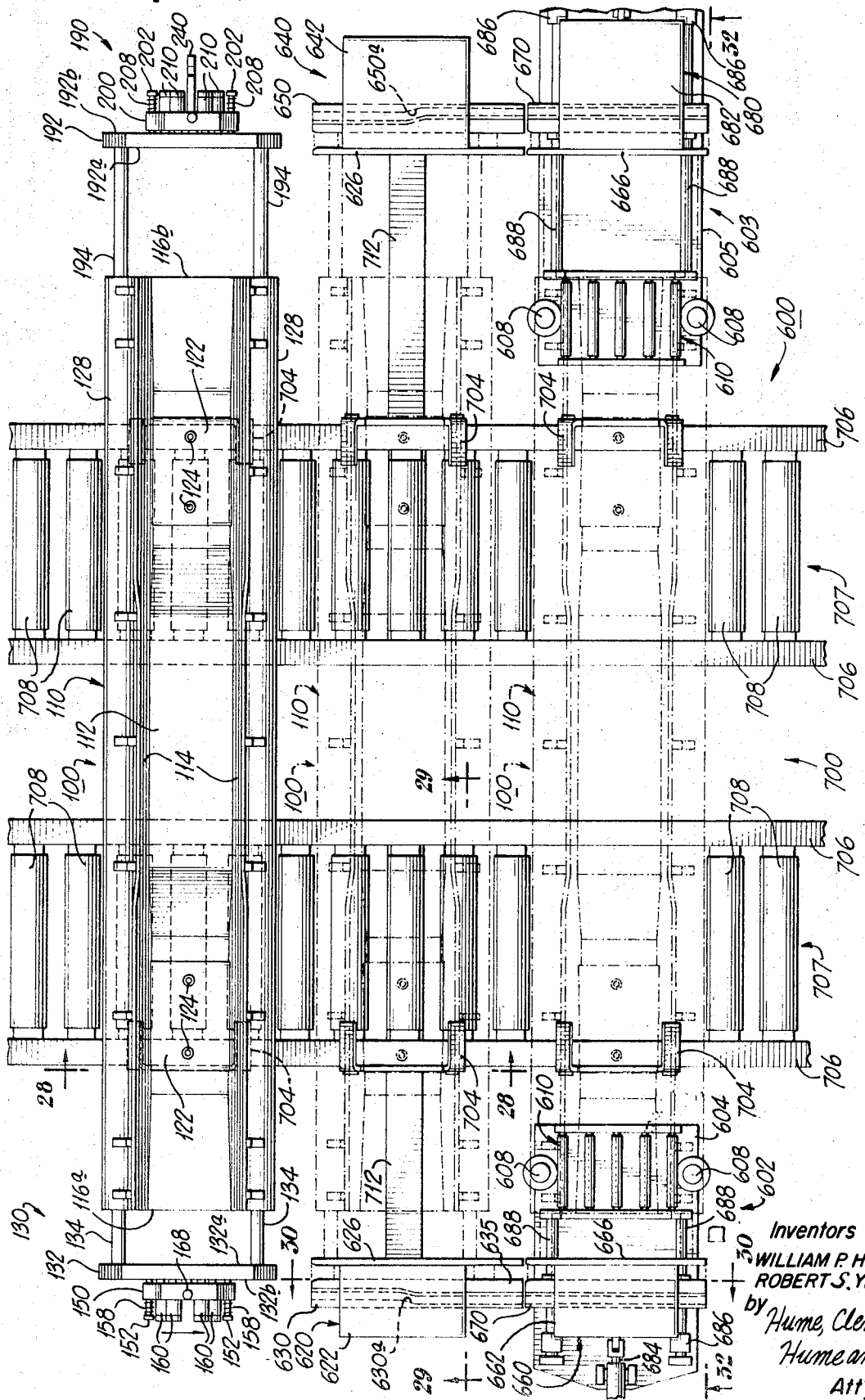

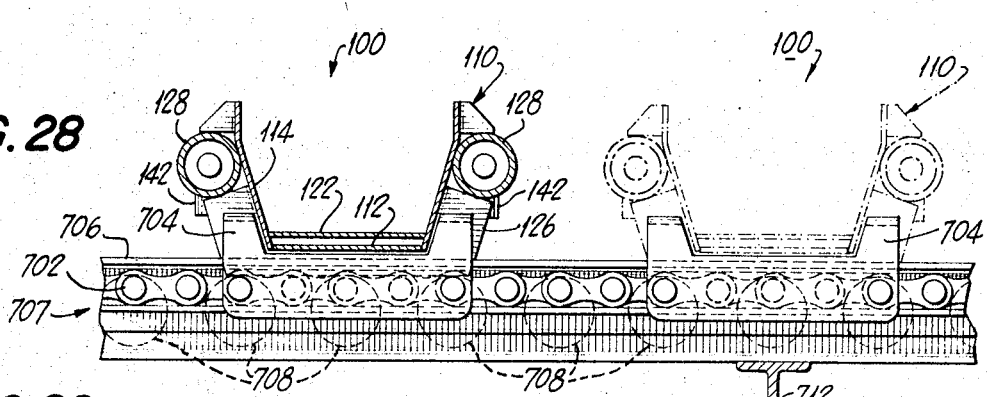
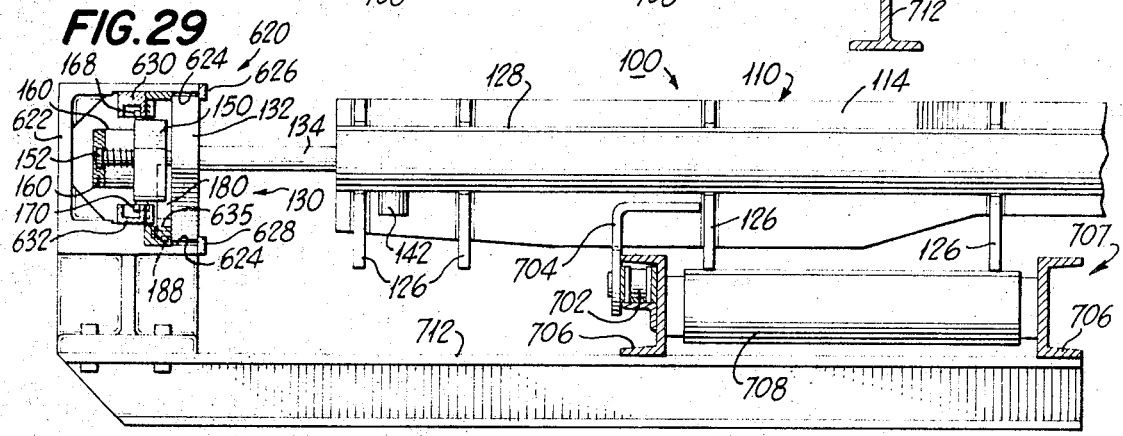
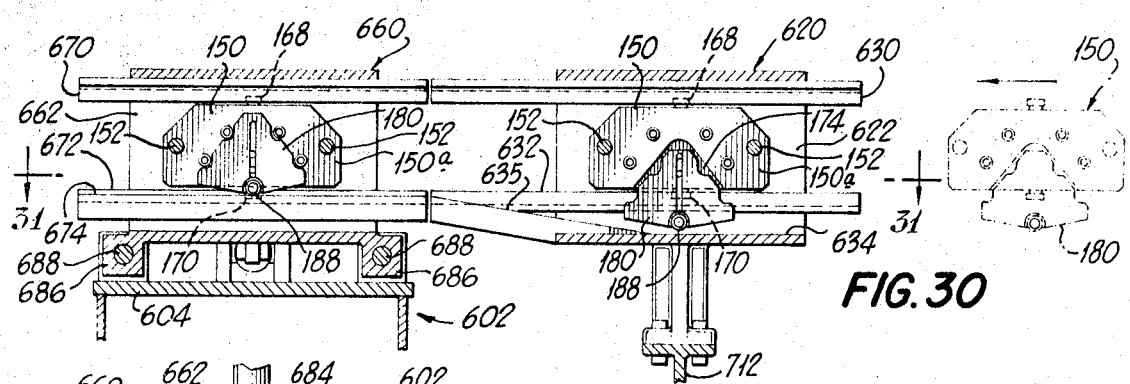
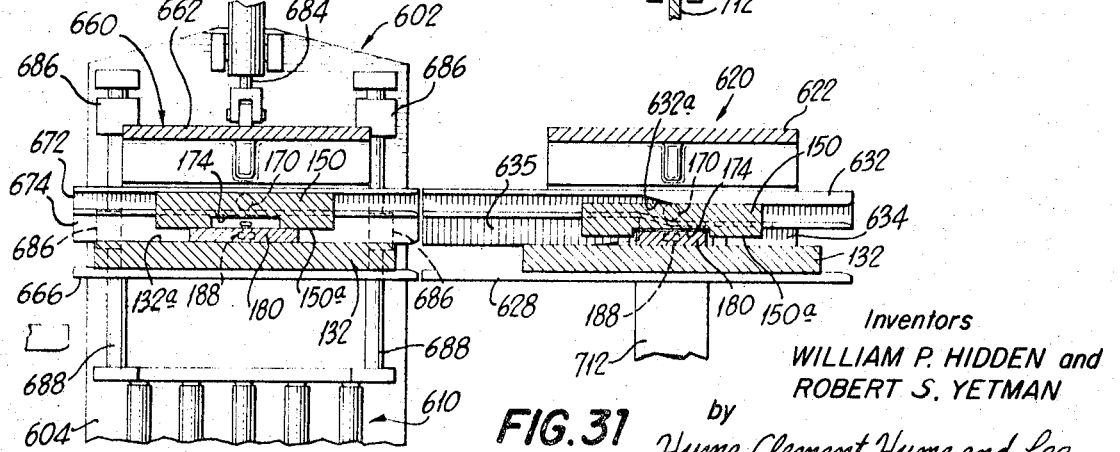

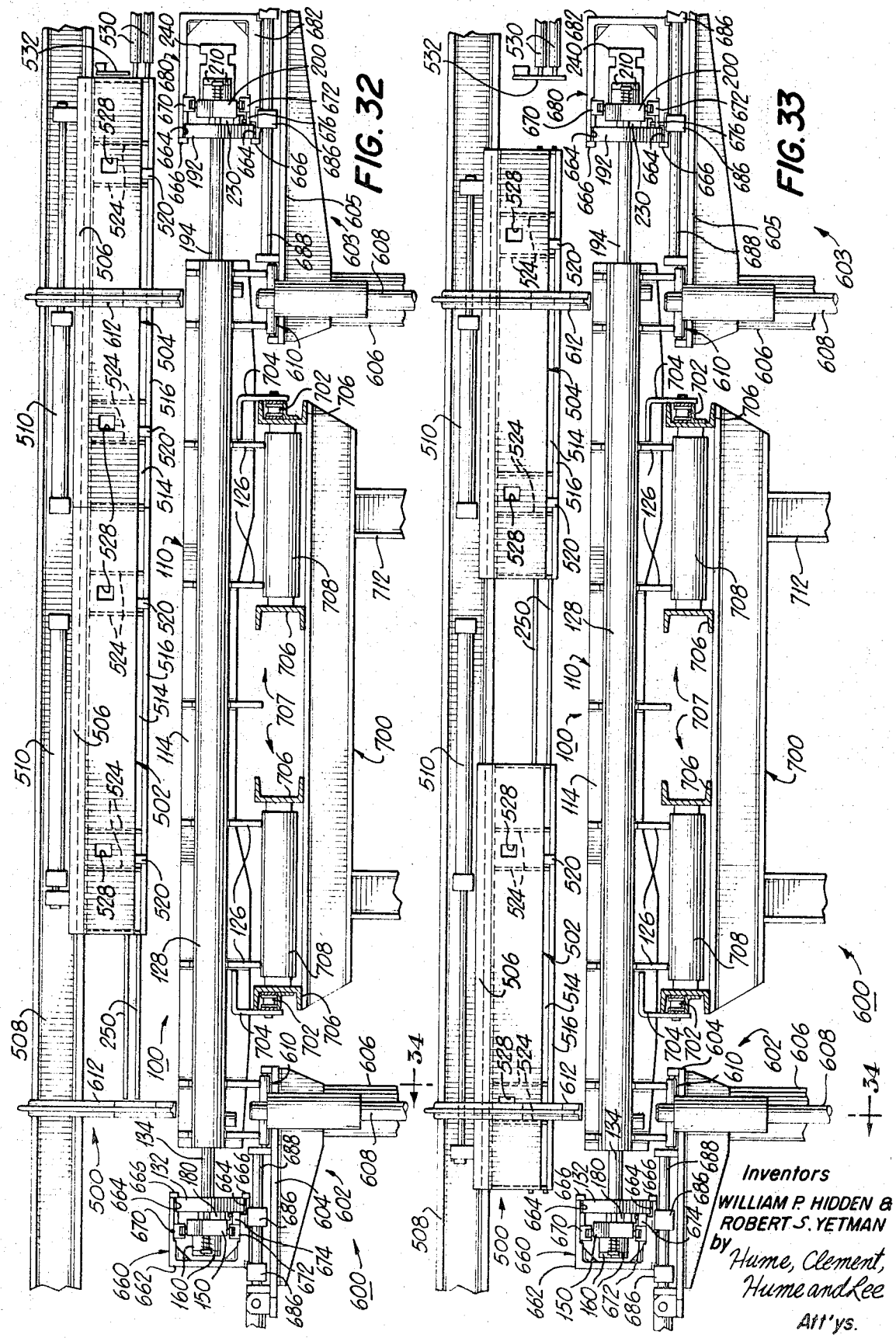

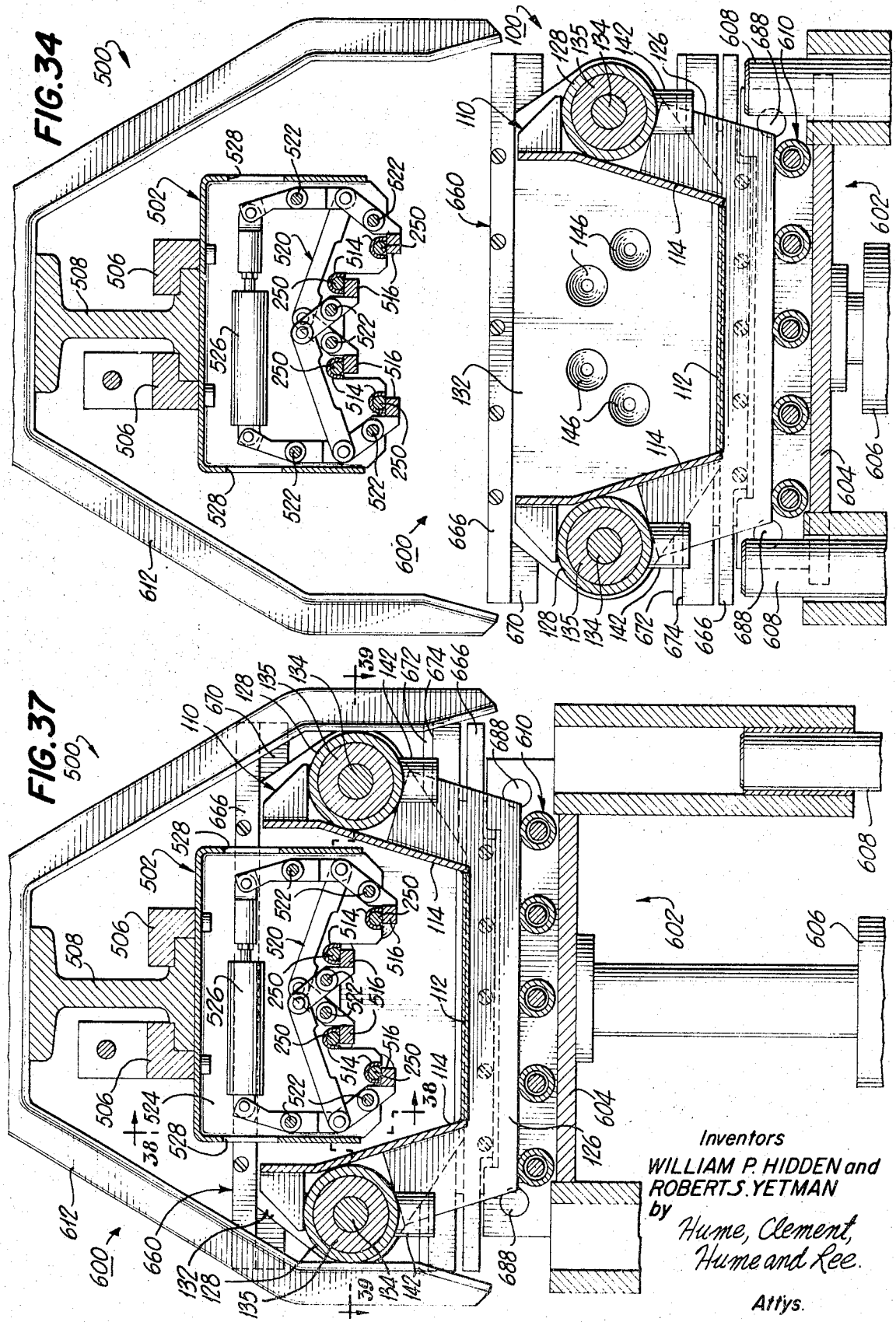

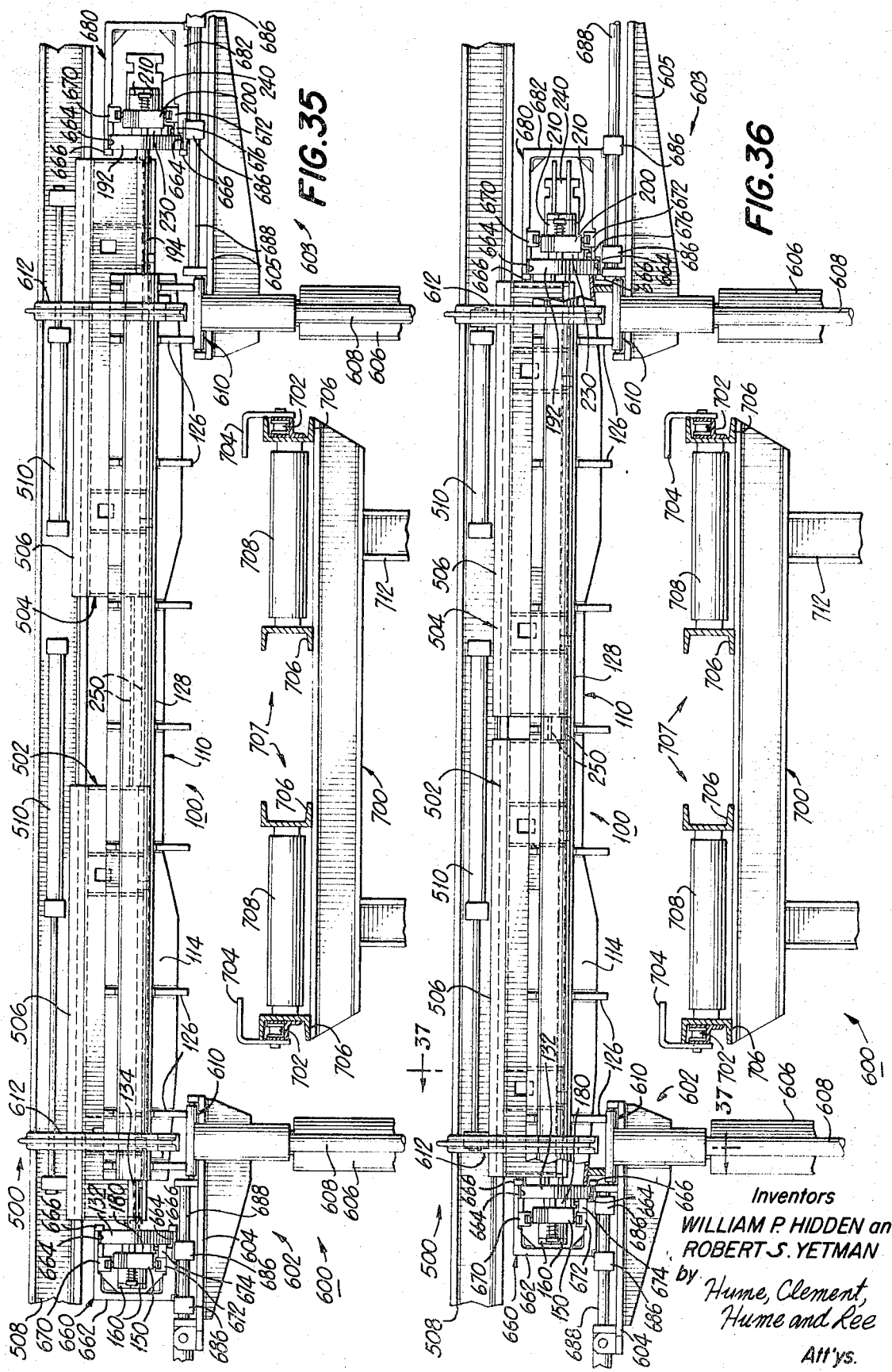

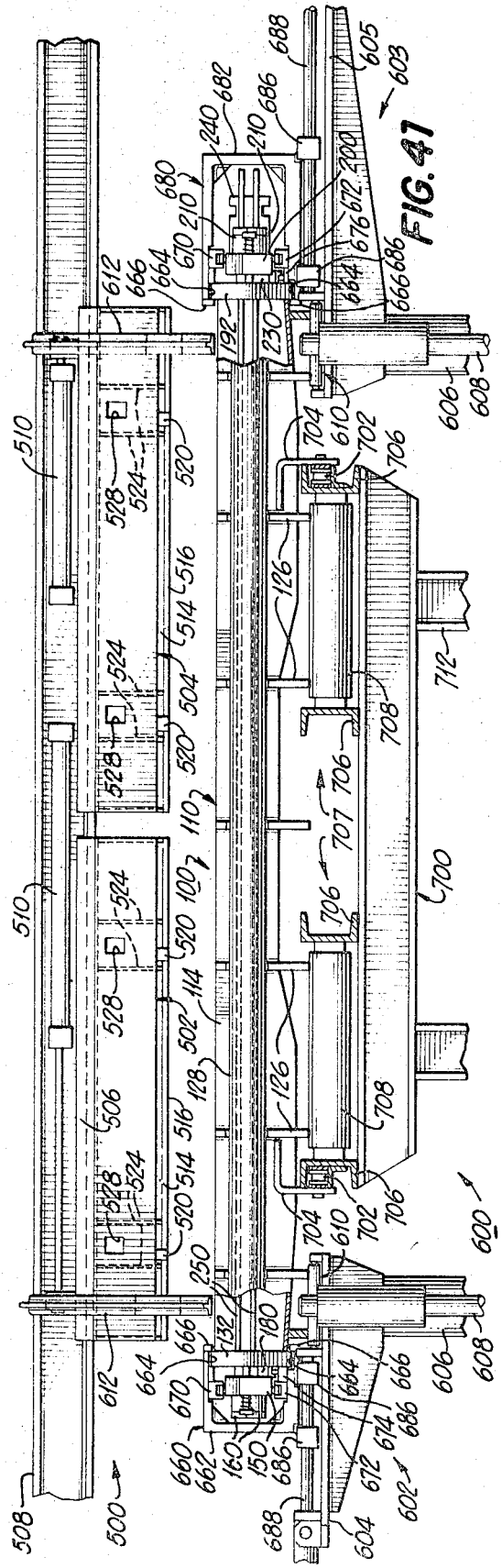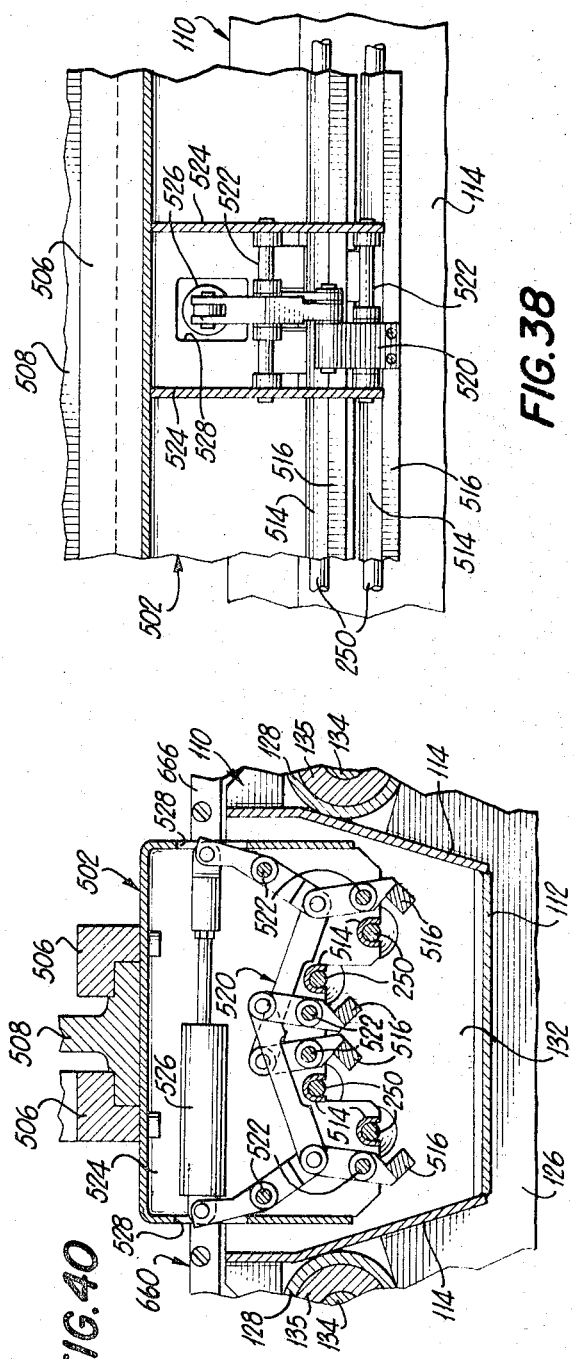

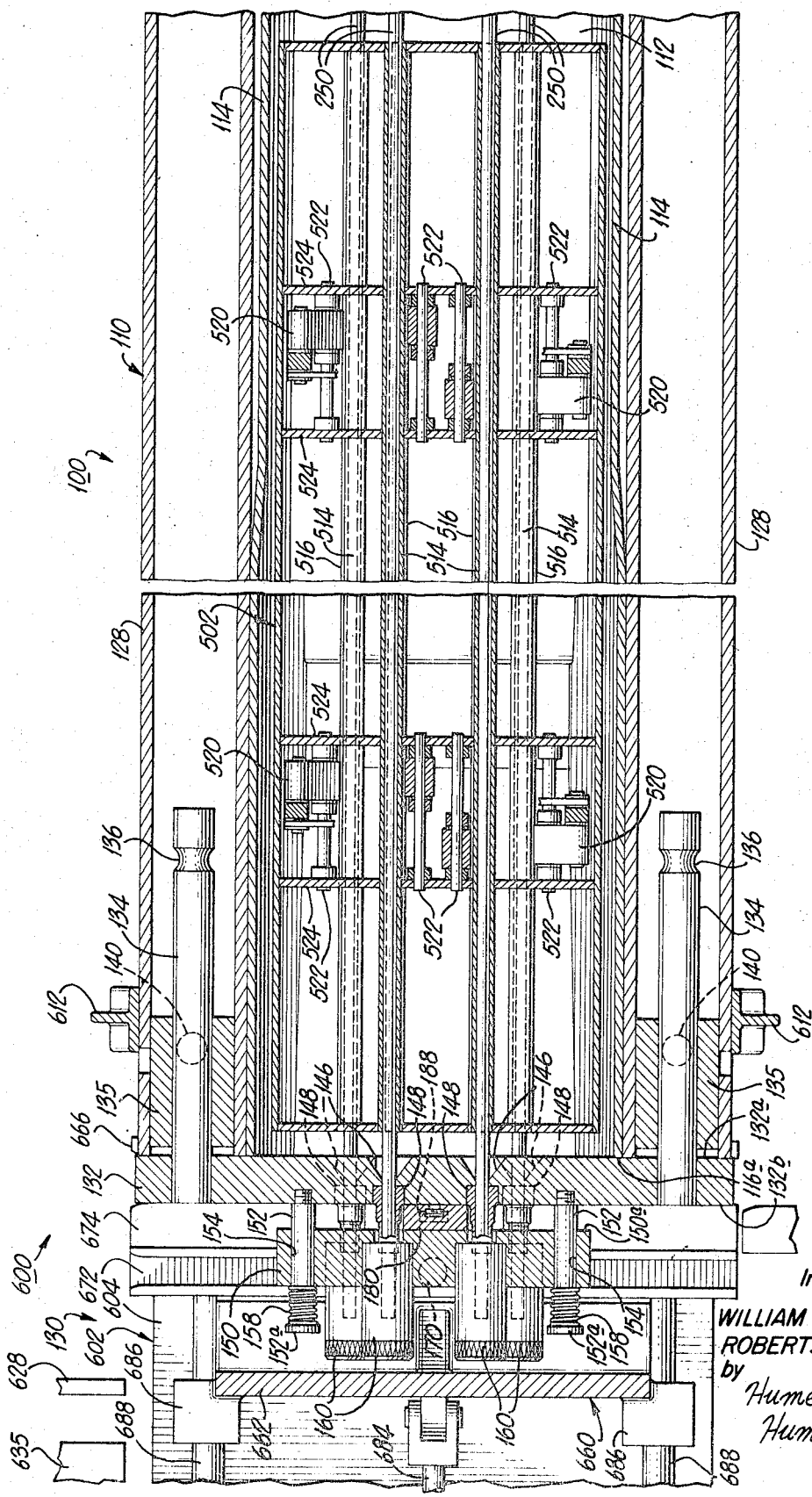

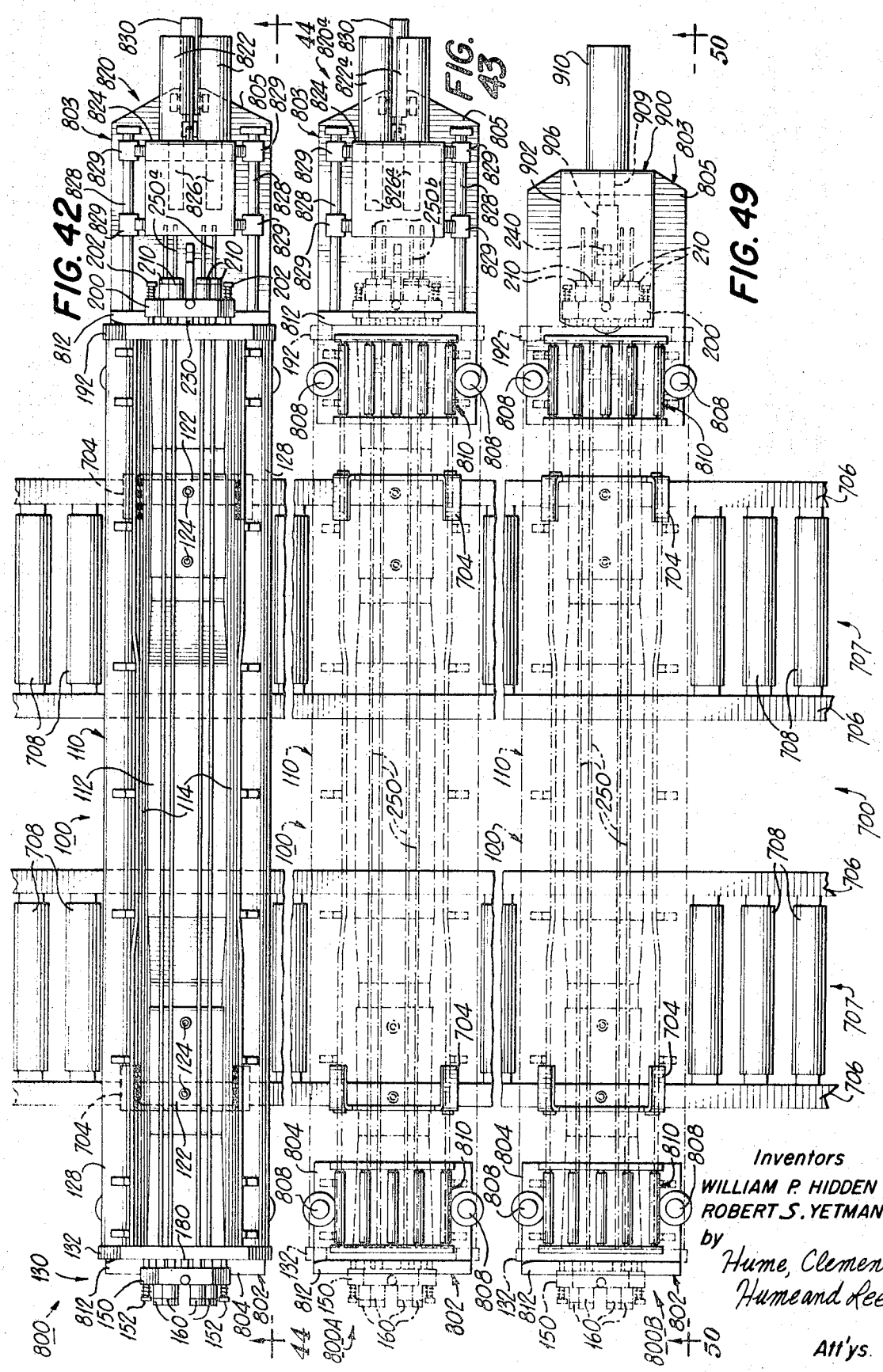

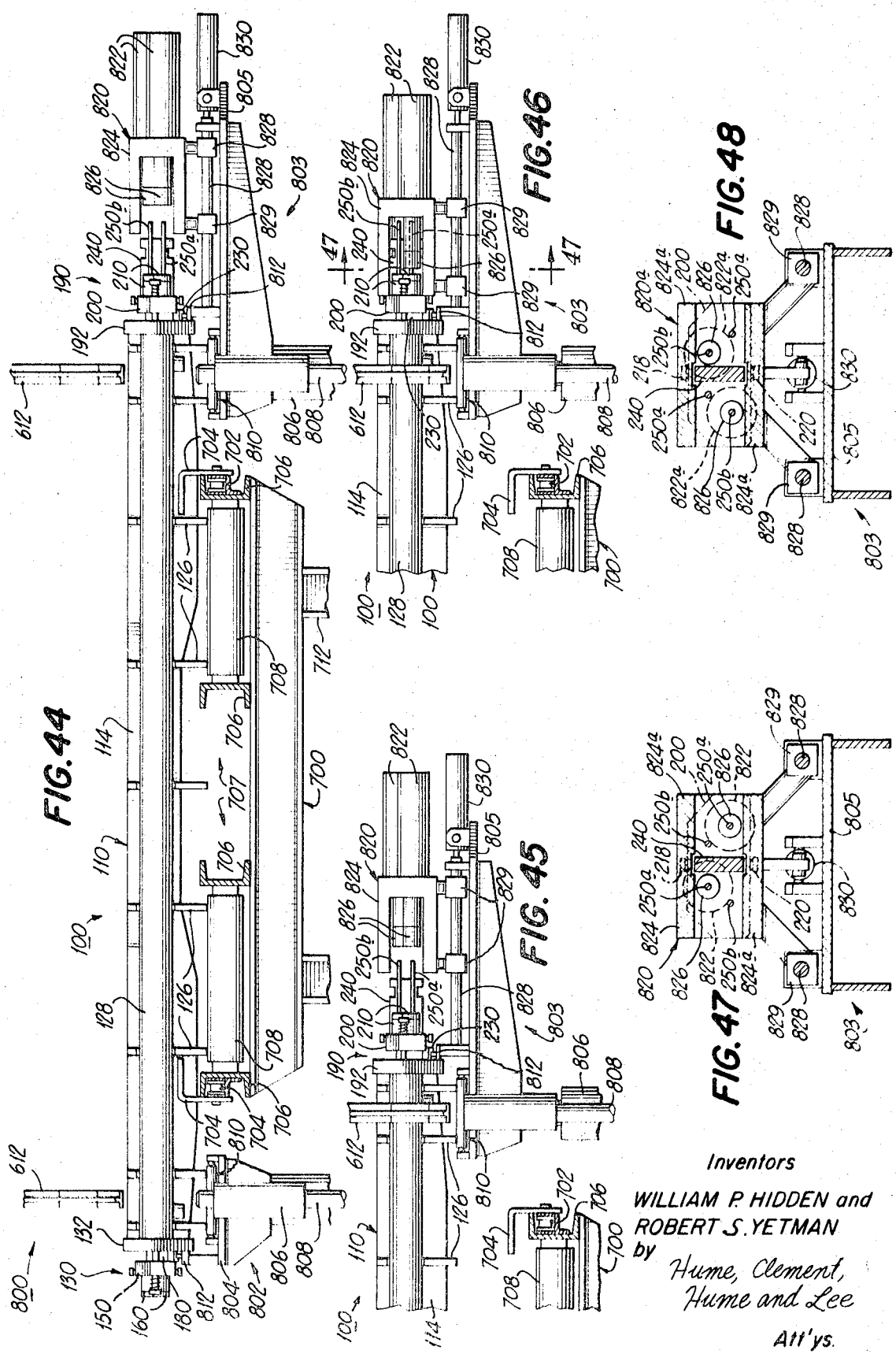

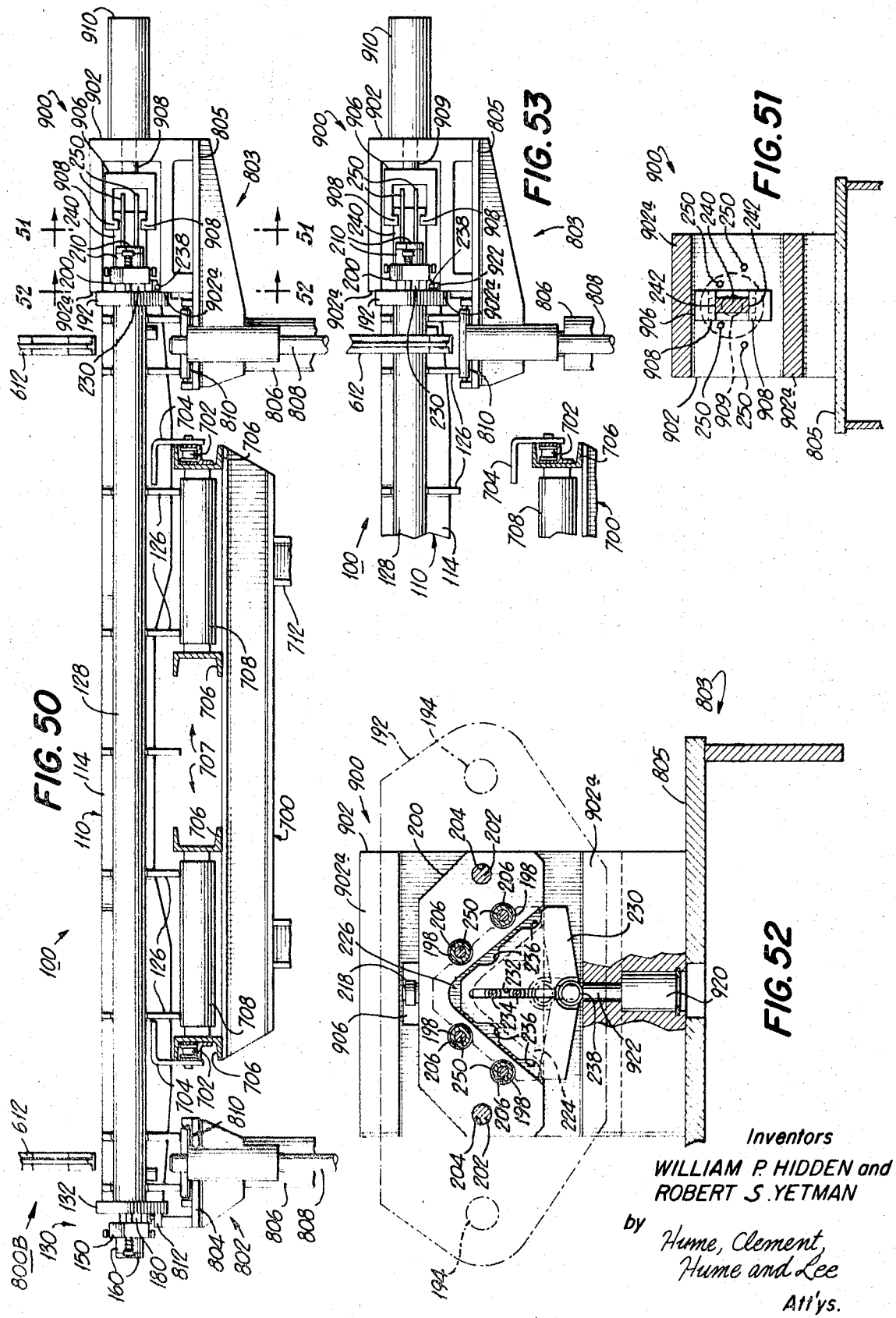

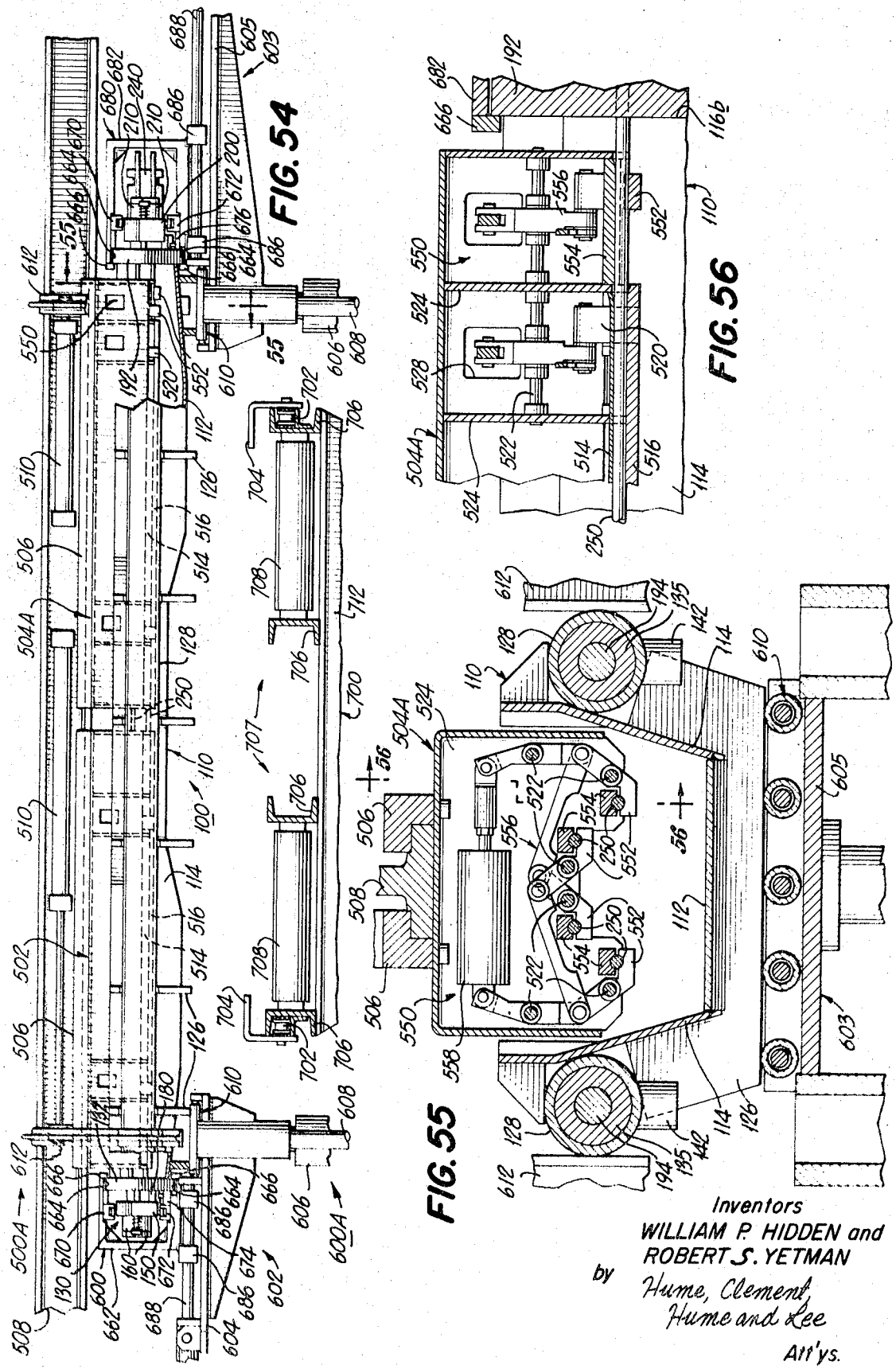

United States Patent Office 3,568,274
Patented Mar. 9, 1971

3,568,274
APPARATUS FOR MAKING PRESTRESSED CONCRETE MEMBERS
William P. Hidden, Wenham, and Robert S. Yetman, Concord, Mass., assignors to Arthur D. Little Inc., Cambridge, Mass.
Filed Apr. 16, 1968, Ser. No. 721,793
Int. Cl. B28b 7/00, 23/06
U.S. Cl. 25—41                                15 Claims

ABSTRACT OF THE DISCLOSURE

A system for manufacturing prestressed concrete members comprising a portable mold for receiving the reinforcing strand and concrete mix, and apparatus for accurately tensioning the strands in the mold to the desired pretensioning level. The portable mold includes end assemblies which include means to receive and grip the free ends of reinforcing strand extended through the mold body and means for maintaining the reinforcing strands under the desired pretensioning load after the strands are tensioned by means of the strand tensioning apparatus. The strand tensioning apparatus comprises means to tension the strands emplaced within the mold by either measuring the tensioning force applied to the strands or by measuring the elongation of the strands resulting from the application of a tensioning force thereto.

RELATED APPLICATIONS

The invention disclosed and claimed herein relates generally to the inventions disclosed and claimed in the application of Stanley V. Margolin, Paul W. Glaser, and Leonard V. Gallagher, entitled "Method and Apparatus for Manufacturing Prestressed Concrete Members," Ser. No. 721,834, the application of William P. Hidden, and Robert E. Hunt, entitled "Cleaning and Oiling System for Molding Apparatus," Ser. No. 721,808, and the application of William P. Hidden, entitled "Portable Molding Apparatus" Ser. No. 721,767, each of which was filed concurrently and commonly assigned with the present application.

BACKGROUND AND SUMMARY OF THE INVENTION

This invention generally relates to method and apparatus for stress-molding concrete members such as concrete railway ties, concrete beams and the like.

The use of prestressed concrete members is very prevalent in many industrial applications in the railroad, building construction and road building industries, because of the inherent structural qualities of such members. The ability of prestressed concrete members to withstand large compressive forces, their resistance to fire and their generally long life have made concrete members directly competitive with other types of structural members made from steel or wood and the like.

However, in many industrial applications the use of prestressed concrete members has been found to be expensive or inconvenient due to the manner in which the members are manufactured. Many systems for manufacturing concrete members require a high input of direct labor and fail to use mass-production techniques, thereby significantly increasing the unit cost for the concrete members. For example, most of the systems heretofore employed to make concrete railway ties have used elaborate and expensive equipment, or poorly designed equipment, calling for a high degree of manual labor. As a result, such systems fail to make prestressed concrete ties which are directly competitive with wooden cross-ties. Obviously, the use of concrete members as railway ties, and in many other applications, could be increased substantially if a manufacturing system could be devised which reduces the cost for each concrete unit by minimizing labor costs and by permitting the members to be made on an automated mass-production basis.

In addition to the problems of costly operation, prior systems for making concrete members have often included apparatus which caused the members to be cast with flaws or defects, such as "honeycombing" of the concrete in the critical areas adjacent the reinforcing strand and at the ends of the members. These flaws may prevent the concrete from bonding properly to the reinforcing strand, thereby diminishing the effectiveness of the strand, and may even cause the concrete member to fail prematurely.

Another problem with many prior concrete manufacturing systems relates to the placement and tensioning of the reinforcing strand in the mold, before the concrete mix is poured into the mold and cured. Because of poorly designed molds and strand placement and tensioning equipment, it has been difficult to accurately place the reinforcing strand in the mold and then maintain the strand under the proper tension during the subsequent molding operations. It has been particularly difficult to accurately place and tension strand within a mold when an automated manufacturing process is employed. In making many relatively small concrete members, such as concrete railway ties, the application of the proper tensioning force to the strand and the spacing of the strand in the mold are critical requirements which must be met in order to produce an acceptable concrete product.

Accordingly, to solve these above-mentioned problems, this invention provides a system including method and apparatus which permits concrete members to be stress-molded efficiently and rapidly, on a mass-production basis. To accomplish this, one aspect of this invention provides a portable molding apparatus which receives the reinforcing strand and concrete mix, to form a prestressed member of the desired configuration. In accordance with this invention, the portable mold will freely receive the reinforcing strand, position the strand in the proper location within the mold, and maintain the strand under the desired tensioning load during the concrete casting operations.

Another aspect of this invention provides method and apparatus for receiving a supply of reinforcing strand from a suitable source, and for emplacing the desired lengths of strand into the cavity of a portable mold. In accordance with this invention, such strand placing operation requires a minimum of direct labor, and is adaptable for use in a highly automated system for manufacturing prestressed concrete members.

Still another aspect of this invention relates to methods and apparatus for tensioning the reinforcing strand emplaced within a mold. In this aspect of the invention the portable molding apparatus and tensioning apparatus cooperate to subject the strands in the mold to the desired tension level, and maintain such tension throughout the subsequent concrete casting and curing operations. In accordance with this invention, the strands emplaced within the portable mold can be tensioned accurately by either measuring the tensioning force applied to the strands, or by measuring the elongation of the strands resulting from the application of a tensioning force thereto.

EXEMPLARY EMBODIMENT

The exemplary embodiment of the method and apparatus in accordance with this invention is particularly adapted for use in stress-molding a current form of concrete railway tie. The current specifications of the American Association of Railroads require the illustrated type of concrete ties to be prestressed by four lengths of wire reinforcing strand. The total initial pretensioning force on the four strands is specified as 100,000 pounds, but not to exceed 80% of the ultimate strength of the strands. The force is further require to be equally distributed among the strands, at 25,000 pounds per strand.

The method and apparatus embodying the features of the present invention permit these rigid specifications for concrete ties to be substantially satisfied, even while the ties are being manufactured rapidly mass-produced. However, it will be recognized by those skilled in the art that the present invention is readily adaptable for use in manufacturing many types of pre-stressed concrete units other than railway ties, with substantially the same degree of accuracy and speed.

The various features of the present invention will be more fully understood by considering the following description of the exemplary embodiment taken in conjunction with the drawings, in which:

FIG. 1 is a plan view of a portable molding apparatus embodying the features of the present invention, illustrating the mold body and the mold end assemblies, with the end assemblies in an extended or open position with respect to the mold body;

FIG. 2 is an elevational view of the portable molding apparatus shown in FIG. 1;

FIG. 3 is a cross-sectional view of the portable molding apparatus, taken along the line 3—3 in FIG. 1;

FIG. 4 is an elevational end view of the mold body of the portable molding apparatus, as viewed along the line 4—4 in FIG. 3;

FIG. 5 is a cross-sectional view of the central portion of the mold body, taken along the line 5—5 in FIG. 3;

FIG. 6 is a cross-sectional view of the right end portion of the mold body, taken along the line 6—6 in FIG. 3;

FIG. 7 is an elevational end view of the portable molding apparatus, viewed along the line 7—7 in FIG. 2, showing one of the movable mold end assemblies in accordance with this invention, located at the left end of the portable molding apparatus.

FIG. 8 is an exploded front perspective view of the left mold end assembly illustrated in FIG. 7;

FIG. 9 is an exploded rear perspective view of the left mold end assembly illustrated in FIG. 8;

FIG. 13 is a cross-sectional view taken along the line 13—13 in FIG. 1, showing the components of the movable mold end assemblies arranged in an "unlocked" position;

FIG. 14 is a sectional view of the portable molding apparatus similar to FIG. 13, showing the components of the mold end assemblies arranged in a "ready" position and showing the placement of reinforcing wire strand within the molding apparatus;

FIG. 15 is a sectional view of the portable molding apparatus similar to FIG. 14, showing the components of the right mold end assembly arranged in a "locked" position;

FIG. 16 is a sectional view, taken along the line 16—16 in FIG. 15;

FIG. 17 is a cross-sectional view of the portable molding apparatus taken along the line 17—17 in FIG. 7, showing the movable mold end assemblies in their "unlocked" position;

FIG. 18 is a partial sectional view of the molding apparatus illustrated in FIG. 17 with reinforcing strand extending therethrough, showing the mold end assemblies in their "ready" position;

FIG. 19 is an enlarged sectional view of the strand receiving and securing portion of the left mold end assembly illustrated in FIG. 17, showing further details of the end assembly in the "unlocked" position;

FIG. 20 is an enlarged sectional view of the strand receiving and securing portion of the right mold end assembly illustrated in FIG. 17, showing further details of the end assembly in the "unlocked" position;

FIG. 21 is an enlarged sectional view of the portion of the left mold end assembly illustrated in FIGS. 18 and 19, showing the arrangement of the components of the end assembly in the "ready" position;

FIG. 22 is a plan view of the portable molding apparatus illustrated in FIG. 1 after reinforcing wire strand has been placed therein but before the strand is pretensioned, showing the movable mold end assemblies closed against the mold body, with the end assemblies in their "ready" position.

FIG. 23 is a cross-sectional view of the molding apparatus taken along the line 23—23 in FIG. 22, illustrating the arrangement of the reinforcing strands in the mold;

FIG. 24 is a sectional view illustrating a modified movable mold end assembly, shown in a "ready" position with wire strand placed therein, adapted to permit tensioning of the wire by measuring the resulting elongation of the strand rather than the tensioning force;

FIG. 25 is a sectional view of the modified mold end assembly illustrated in FIG. 24, showing the mold end assembly in a "locked" position;

FIG. 26 is a sectional view of an additional modification of the portable molding apparatus in accordance with this invention, wherein both of the movable mold end assemblies are modified to adapt the apparatus for selectively tensioning reinforcing wire strand by either a force-measured or elongation-measured tensioning method;

FIG. 27 is a plan view of a reinforcing strand placement station in accordance with this invention, illustrating the various conditions of the portable molding apparatus as the mold approaches the strand placement station to receive the reinforcing strands;

FIG. 28 is a sectional view taken along the line 28—28 in FIG. 27, illustrating a mold conveyor system for carrying the molds to the strand placement stations;

FIG. 29 is a sectional view taken along the line 29—29 in FIG. 27, illustrating cam track means for controlling the position of the movable mold end assemblies as the mold approaches the strand placement station;

FIG. 30 is a sectional view taken along the line 30—30 in FIG. 27 illustrating the relationship between the cam track means and the movable mold end assemblies as the mold advances to the strand placement station and the mold end assemblies are prepared for receiving reinforcing strand;

FIG. 31 is a sectional view of the cam track means and mold end assemblies taken along the line 31—31 in FIG. 30;

Figure 11:
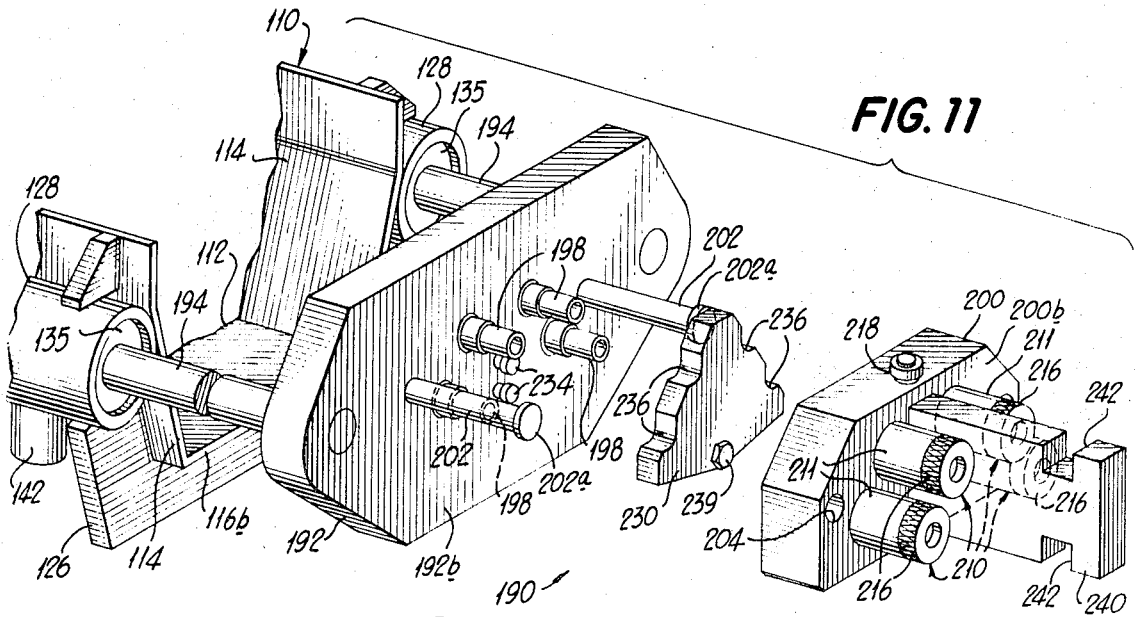
FIG. 11 is an exploded front perspective view of the right mold end assembly illustrated in FIG. 10.

FIG. 32 is an elevational view of the reinforcing strand placement station, as viewed along the line 32—32 in FIG. 27, showing a strand placement head in accordance with this invention, with the head initially positioned to receive reinforcing strand from a strand-feeding apparatus, and with the movable end assemblies of the portable molding apparatus located in an open position spaced from the mold body;

FIG. 33 is an elevational view of the strand placement station shown in FIG. 32, showing the strand placement head in a second position aligned above the portable molding apparatus between the open mold end assemblies, in preparation of placing reinforcing strands within the molding apparatus;

FIG. 34 is a cross-sectional view of the strand placement station, taken along the line 34—34 in FIG. 33, illustrating the relationship between the strand placement head and the portable molding apparatus before the reinforcing strands are placed with the molding apparatus;

FIG. 35 is an elevational view of the strand placement station similar to FIGS. 32 and 33, showing the strand placement head in a third position vertically aligned with the portable molding apparatus between the open mold end assemblies, to place the reinforcing strand within the molding apparatus;

FIG. 36 is an elevational view of the strand placement station shown in FIG. 35, showing the end assemblies of the portable molding apparatus closed against the mold body to secure the reinforcing wire strand within the mold body;

FIG. 37 is a cross-sectional view taken along the line 37—37 in FIG. 36, illustrating the relationship between the strand placement head and the portable molding apparatus as the reinforcing strand is being placed within the molding apparatus;

FIG. 38 is a sectional view taken along the line 38—38 in FIG. 37, showing the arrangement of the releasable strand-supporting means in the placement head in accordance with this invention;

FIG. 39 is a cross-sectional view of the strand placement head and portable molding apparatus, taken along the line 39—39 in FIG. 37, illustrating the positioning of the strand placement head and the portable molding apparatus after the movable mold end assemblies are closed over the free ends of the reinforcing strand;

FIG. 40 is a cross-sectional view of the strand placement head similar to FIG. 37, showing the strand-supporting means of the placement head in an open or released position;

FIG. 41 is an elevational view of the strand placement station in accordance with this invention, showing the portable molding apparatus retracted from the strand placement head after the reinforcing strand has been placed within the molding apparatus;

FIG. 42 is a plan view of a force-measured strand tensioning station in accordance with this invention, showing the portable molding apparatus aligned with a tensioning head which tensions two of the four strands within the molding apparatus by measuring the pretensioning force applied to the strands;

FIG. 43 is a plan view of a force-measured strand tensioning station, similar to the station illustrated in FIG. 42, with the station being adapted to tension the other two of the four reinforcing strands by measuring the pretensioning force applied to the strands;

FIG. 44 is an elevational view of the force-measured strand tensioning station, as viewed along the line 44—44 in FIG. 42, illustrating the means to longitudinally align the portable molding apparatus with the strand tensioning head.

FIG. 45 is a partial elevational view of the force-measured tensioning head shown in FIG. 44, illustrating the means for aligning the portable molding apparatus transversely with respect to the tensioning head;

FIG. 46 is a partial elevational view of the tensioning head shown in FIG. 44, illustrating the tensioning head connected to the reinforcing strands in preparation for applying a measured pretensioning force to two of the strands;

FIG. 47 is a cross-section view of the force-measured tensioning head taken along the line 47—47 in FIG. 46, showing the bearing surfaces between the tensioning head and the adjacent mold end assembly as two of the wire strands are tensioned;

FIG. 48 is a sectional view similar to FIG. 46 but illustrating the bearing surfaces for tensioning the other two reinforcing strands by means of the force-measured tensioning head shown in FIG. 43;

FIG. 49 is a plan view of a modified elongation-measured strand tensioning station in accordance with this invention, showing the portable molding apparatus aligned with a strand tensioning head which tensions the reinforcing strands within the molding apparatus by measuring the elongation of the strands;

FIG. 50 is an elevational view of the elongation-measured tensioning station, as viewed along the line 50—50 in FIG. 49, illustrating the means employed to align the portable molding apparatus longitudinally with respect to the tensioning head;

FIG. 51 is a cross-sectional view taken along the line 51—51 in FIG. 50, showing the bearing surfaces between the tensioning head and the adjacent mold end assembly as pretensioning force is applied to the reinforcing strands;

FIG. 52 is a cross-sectional view taken along the line 52—52 in FIG. 50, illustrating the arrangement of the components of the right mold end assembly in a "ready" position, and further illustrating the means for adjusting the end assembly components in a "locked" position after the reinforcing wire strands have been pretensioned;

FIG. 53 is a partial elevational view of the elongation-measured tensioning head shown in FIG. 50, illustrating the arrangement of the tensioning head and the adjacent right mold end plate assembly after the tensioning head has been actuated to apply the desired tensioning force to the reinforcing strands, and after the right mold end plate assembly has been actuated into its "locked" position;

FIG. 54 is an elevational view of a modified strand placement station in accordance with this invention, showing the strand placement head adapted to initially pretension the reinforcing wire strand when the strand is to be tensioned by employing the elongation-measured tensioning head illustrated in FIGS. 49–53;

FIG. 55 is a cross-sectional view of the modified strand placement head, taken along the line 55—55 in FIG. 54, illustrating the means on the placement head for gripping the reinforcing strands during the initial pretensioning of the strands; and FIG. 56 is a partial sectional view of the modified strand placement head, taken along the line 56—56 in FIG. 55, illustrating the longitudinal positioning of the strand gripping means within the modified placement head.

PORTABLE MOLDING APPARATUS

An embodiment of the portable molding apparatus in accordance with this invention, adapted to cast a current type of prestressed concrete railway ties, is illustrated in FIGS 1 through 26 of the drawings. The portable mold, generally indicated by the reference numeral 100, is designed to readily receive strands of reinforcing wire 250 and a charge of suitable concrete mix. The portable mold 100 is also designed to maintain the reinforcing strands 250 in the proper position and under the proper pretensioning load within the mold 100 so that the concrete mix charged into the mold can be cast around the strands 250 to form a pre-stressed concrete railway tie.

Referring to FIGS. 1 through 6 in more detail, the portable mold 100 comprises a mold body 110 which defines an open-ended mold cavity for receiving a charge of concrete mix and the reinforcing wire strands 250. The portable mold 100 also includes movable mold end assemblies 130 and 190, slidably mounted on the mold body 110 adjacent the open ends 116 of the mold body. These mold end assemblies 130 and 190 can be moved from an open position, as shown in FIGS. 1 and 2, to a closed position against the adjacent ends 116 of the mold body 110 (as shown in FIG. 22) to close the open ends of the mold body. Additionally, the mold end assemblies 130 and 190 are adapted to receive the free ends of reinforcing wire strands 250 placed in the mold body 110 (FIGS. 18 and 22 and to maintain the strand 250 under the desired pretensioning load during the pouring and curing of the concrete mix.

More specifically, the mold body 110 of the portable mold 100 includes a preshaped bottom wall 112 and inclined side walls 114 joined to form an elongate mold body, which preferably has open ends 116. Since the illustrated embodiment is adapted to cast prestressed railway ties, the bottom and side walls 112 and 114 are shaped so that the mold 110 has a central portion 118 and end portions 120, for forming the center and ends of the tie, respectively. In the illustrated embodiment, the mold body 110 casts the railway tie in an inverted position, so that the bottom wall 112 defines the top surface of the tie. Accordingly, each end portion 120 of the bottom wall 112 includes rail pad plates 122 for forming the rail-bearing surfaces in the top surface of the cast railway tie. Each of the rail pad plates 122 in turn includes a pair of studs 124 for releasably retaining threaded inserts on the surface of the rail pad plates 122. Such threaded inserts (not shown) are to be cast within the concrete tie, adjacent the rail-bearing surfaces, and will receive fasteners, such as bolts and the like, for securing conventional rail fixtures to the concrete tie.

The mold body 110 embodying the features of the present invention also is provided with transverse reinforcing members 126. The members 126 are spaced uniformly along the length of the mold body 110, and reinforce the bottom and side walls 112 and 114 to assure that the mold maintains the desired internal configuration. Furthermore, since the mold body 110 will be subjected to substantial longitudinal compressive forces as a result of the pretensioning of the reinforcing wire strand 250, the mold side walls 114 are provided with longitudinal compression members or tubes 128. As illustrated in FIGS. 1 and 22, the compression tubes 128 extend for the full length of the mold body 110 so that the ends of the tubes will engage the mold end assemblies 130 and 190 when the end assemblies are closed against the mold body 110. By this arrangement, the tubes 128 reinforce the mold body 110 in the longitudinal direction, and resist the compressive forces on the mold body resulting from the pretensioning of the strands 250.

An embodiment of the left mold end assembly 130 of the portable mold 100 in accordance with this invention is shown in detail in FIGS. 7 through 9. The end assembly 130 is movably mounted on the mold body 110, and is designed to close the left end 116a of the mold body 110, thereby defining the left end of the concrete member being cast in the mold 100. The end assembly 130 is further designed to receive and grip the free ends of reinforcing strand 250 which project outwardly from the left end of the mold body 110. In the illustrated embodiment of this invention, the end assembly 130 is a two-position assembly, since the components of the end assembly 130 are capable of being adjusted between two positions ("unlock" and "ready") to facilitate the placement and tensioning of the reinforcing strands 250 within the mold 100.

Referring to FIGS. 2 and 7–9 in more detail, the end assembly 130 includes a mold end plate 132 which is joined to the mold body 110 by guide rods 134. As seen in FIGS. 2 and 8, the guide rods 134 are slidably mounted in the ends of the compression tubes 128 by means of bushings 135. By this arrangement, the end plate assembly 130 is capable of translating longitudinally with respect to the mold body 110 by sliding the guide rods 134 within the bushings 135. Thus, the end plate assembly 130 can be selectively moved from an open position spaced from the mold body 110, such as shown in FIGS. 1 and 2, to a closed position, with the inward face 132a of the end plate 132 bearing against the mold end 116a. As shown in FIGS. 14, 15 and 22, in this latter closed position, the mold end assembly 130 operates to completely close the left end 116a of the mold body 110.

As illustrated in FIG. 2, the mold body 110 may also be provided with a suitable detent means 138 for releasably retaining the mold end assembly 130 in the above-described open position with respect to the mold body 110. The detent means 138 comprises a spring-biased retaining ball 140 which is urged by a suitable compression spring (not shown) toward a retaining groove 136 in the guide rods 134. A suitable housing for such a compression spring is illustrated by the cylinder 142 in FIG. 2. The detent means 138 is designed to prevent the end assembly 130 from coming free from the mold body 110 during the storage and handling of the portable mold 100. However, the detent 138 can be readily released by an inward force directed against the mold end assembly 130. Hence, the dtent 138 will not interfere with the closing of the left end 116a of the mold body 110 during the placement of the strands 250.

As shown in FIGS. 8 and 9, the mold end plate 132 is provided with an array of openings 146 for receiving the free ends of the reinforcing strands 250. Openings 146 are countersunk on the inward face 132a of the end plate 132 (FIG. 9) so that the strands 250 can be readily fed through the openings from the inside of the mold body 110. In addition, these strand-receiving openings 146 include elongate bushings 148, as clearly illustrated in FIG. 8, to assist in guiding the free ends of the strands 250 through the openings. In accordance with the present invention, the bushings 148 have a predetermined internal diameter, selected to correspond to the desired size of reinforcing strands 250. The bushings 148 are also dimensioned to project outwardly beyond the outward face 132b of the end plate 132 by a predetermined distance.

The left mold end assembly 130 further includes a strand anchoring or chuck plate 150, as shown in FIGS. 8 and 9. The chuck plate 150 is slidably mounted adjacent the outward side of the end plate 132 by means of guide pins 152 extending through guide apertures 154. By this arrangement, the chuck plate 150 is capable of translating longitudinally upon the guide pins 152 with respect to the adjacent mold end plate 132. As shown in FIGS. 8 and 9, the guide pins 152 include heads 152a which limit the outward movement of the chuck plate 150. In addition, suitable compression springs 158, as illustrated in FIGS. 1 and 17, may be positioned between the heads 152a and the chuck plate 150 for biasing the chuck plate 150 inwardly toward the mold end plate 132.

The chuck plate 150 is also provided with an array of strand-receiving openings 156 positioned in direct longitudinal alignment with the openings 146 on the mold end plate 132. Accordingly, the leftward ends of strands 250 can be fed through the aligned strand-receiving openings 146 and 156 in the end plate 132 and chuck plate 150, respectively. As shown in FIGS. 17–19, the openings 156 in the chuck plate 150 are also dimensioned so that the outward portion of each bushing 148 can extend into the adjacent opening.

In order to secure the free ends of the strands 250 to the chuck plate 150, a strand gripping chuck 160 is positioned on the chuck plate 150 in direct alignment with each of the strand receiving openings 156. These chucks 160 are preferably designed to permit the strands 250 to move outwardly through the aligned openings 146 and 156, but operate to grip the strands 250 and prevent the inward retraction of the strands. Thus, the strands 250 can be readily placed within the mold body 110 and extended outwardly through the aligned openings 146 and 156. However, the strand chucks 160 prevent the inward retraction of the strands 250, and thereby secure the strands 250 within the mold 100.

A suitable form of strand chuck 160 is illustrated in detail in FIGS. 17, 19 and 21. In this illustrated form, each of the chucks 160 includes a set of wedge-shaped jaws 162 aligned within a chuck housing 161. The jaws 162 thereby define a chuck throat 163 through which the strands 250 may extend. A compression spring 164 is positioned within a chuck cap 166, and urges the chuck jaws 162 laterally within the housing 161. The construction and operation of this type of strand chuck are fully described in U.S. Pat. No. 3,163,904, issued Jan. 5, 1965 to Ziolkowski, entitled "Strand Chucks."

Due to the wedge-shaped configuration of the chuck jaws 162, the force of the compression spring 164 continuously urges the jaws 162 into the chuck throat 163. The wedge-shaped configuration of the jaws 162 also permits the jaws to retract away from the chuck throat 163 when a force against the jaws overcomes the force of the compression spring 164. Thus, the strand chucks 160 permit the strands 250 to be fed through the chuck throat 163 in an outward direction toward the chuck caps 166 (leftward in FIGS. 19 and 21). On the other hand, the springs 164 and the shape of the jaws 162 urge the jaws into the chuck throat 163 and against the strands 250 to prevent the strand from retracting inwardly from the chucks 160 (rightward in FIGS. 19 and 21).

The action of the above-described strand chucks 160 in accordance with this invention is further controlled by the bushings 148 which project outwardly from the mold end plate 132. As illustrated in FIG. 19, the bushing 148 projects outwardly into the throat 163 of the adjacent strand chuck 160, and engages the chuck jaws 162, when the chuck plate 150 is positioned closely adjacent the end plate 132. Under such conditions, the bushing 148 overcomes the biasing force of the spring 164, and forces the chuck jaws 162 outwardly (leftward in FIG. 19). The bushing 148 thereby deactivates the chuck jaws 162 and unlocks the chuck 160 so that the reinforcing strand 250 can be moved outwardly or inwardly through the chuck throat 163. This "unlocked" condition of the chucks 160 greatly facilitates the removal of the strands 250 from the mold 100 after the molding operation is completed.

The jaws 162 of the chuck 160 are re-activated by moving the chuck plate 150 outwardly with respect to the end plate 132, into the spaced position shown in FIG. 21. With the chuck plate 150 in such spaced position, the bushing 148 is retracted out of engagement with the chuck jaws 162, and the strand chuck 160 is ready to operate in the normal manner. This "ready" position for the chucks 160 facilitates the placement and tensioning of the strands 250 within the mold 100 by permitting the strand 250 to be fed outwardly through the chuck throat 163 and by securing the strands from inward movement through the chuck throat.

The chuck plate 150 embodying the features of the present invention is further provided with a pair of aligned guide rollers 168 and 170, as seen in FIGS. 7–9 of the drawings. The rollers 168 and 170 are designed to engage with camming means or the like to thereby control the positioning of the chuck plate 150 with respect to the end plate 132 during the feeding, placement and tensioning of the strands 250 within the mold 100. Moreover, since compression springs 158 effectively force the chuck plate 150 against the mold end plate 132, the rollers 168 and 170 will also operate to control the longitudinal positioning of the left mold end assembly 130 with respect to the mold body 110 during the feeding, placement, and tensioning of the strands 250.

Additionally, as illustrated in FIG. 9, the inward face 150a of the chuck plate 150 includes a triangular channel 172 which opens at the lower end of the chuck plate 150. The channel 172 thereby provides the chuck plate 150 with a recessed bearing surface 174 which, together with the inward chuck plate face 150a, defines a two-stepped abutment surface between the end plate 132 and the chuck plate 150. By this arrangement, the chuck plate 150 is adapted to receive a slidable locking plate 180 within the channel 172.

Referring to FIGS. 7 through 9, the locking plate 180 on the mold end assembly 130 is preferably triangular in configuration, and includes a vertical slot 182. The slot 182 permits the plate 180 to be slidably mounted upon the mounting pins 184 which project from the outward face of the end plate 132. The locking plate 180 thus can slide vertically on the pins 184 between the opposed faces 132b and 150a of the adjacent end and chuckplates 132 and 150, respectively.

In the preferred embodiment, the slot 182 and pins 184 are arranged so that the locking plate 180 is within the chuck plate channel 172 in the lowermost position, as seen in FIGS. 7 and 13. In such lower position, the locking plate 180 will be engaged between the chuck plate bearing surface 174 and the outward face 132b of the end plate 132. The locking plate 180 can be moved from such lower position to an upward position, as illustrated in FIG. 14, into engagement between the faces 132b and 150a of the end and chuck plates 132 and 150.

As shown in FIGS. 7–9, the upper portion of the locking plate 180 includes recesses 186 so that the upward movement of the plate 180 does not interfere with the reinforcing strands 250 extending through the aligned apertures 146 and 156. In addition, the lower end of locking plate 180 includes a cam roller 188 which is rotatably mounted on a roller pin 189. The cam roller 188 is thereby positioned for engagement with a cam track or other actuating means for controlling the vertical positioning of the locking plate 180 during the concrete molding operations.

Figure 12:
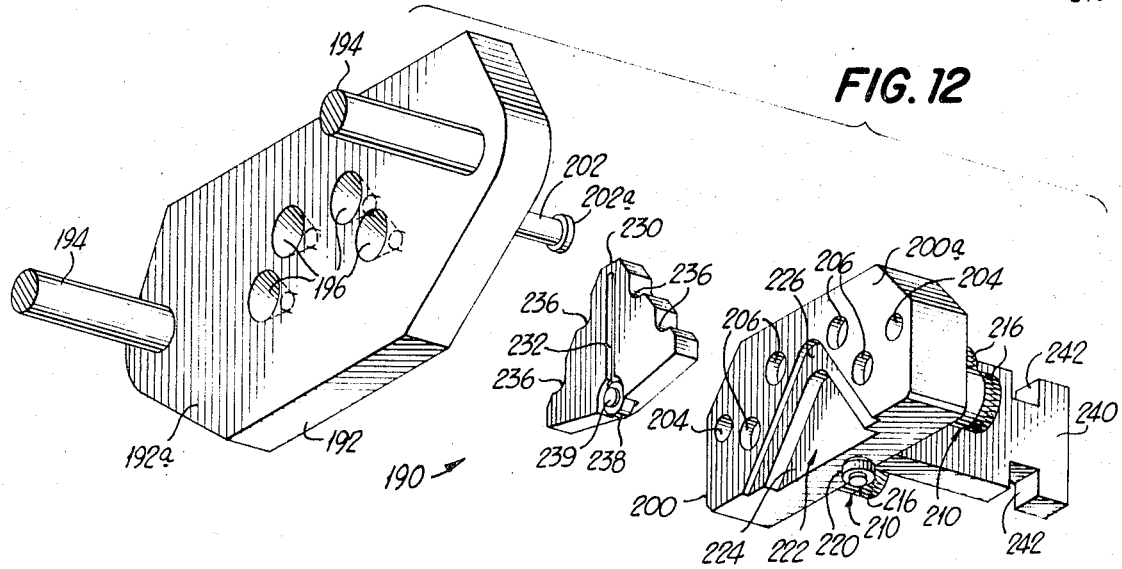
FIG. 12 is an exploded rear perspective view of the right mold end assembly illustrated in FIG. 11.
Figure 10:
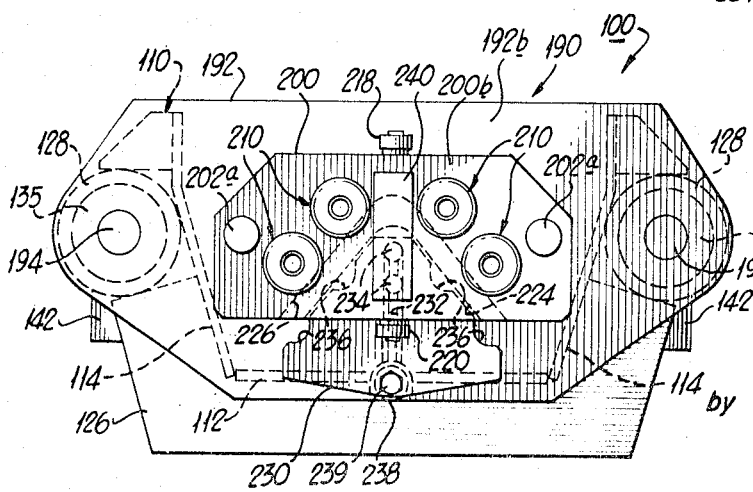
FIG. 10 is an elevational end view of the portable molding apparatus, viewed along the line 10—10 in FIG. 2, showing a movable mold end assembly located at the right end of the portable molding apparatus.

An embodiment of the movable mold end assembly 190, which is mounted on the rightward end of the mold body 110, is illustrated in detail in FIGS. 10 through 12. The construction of the illustrated mold end assembly 190 is substantially similar to the construction of the leftward end assembly 130, as described above. However, in contrast to the mold end assembly 130, the mold end assembly 190 is a three-position assembly, since the components of the assembly 190 can be adjusted to maintain three positions ("unlock," "ready" and "lock") during the placement and tensioning of the reinforcing strands 250.

More specifically, the mold end assembly 190 includes an end plate 192 having inward and outward faces 192a and b, respectively. Similarly, guide rods 194 extend through the bushings 135 on the mold body 110 to slidably position the assembly 190 on the rightward end of the mold body 110. Thus, the mold end assembly 190 can translate longitudinally with respect to the mold body 110 from an outward position, such as shown in FIGS. 1 and 2, to an inward position with the inward face 192a abutting against and closing the right mold end 116b. As in the end plate assembly 130, the guide rods 194 include retaining grooves 136 for engaging with the spring-biased retaining ball of the end plate detent means 138.

As shown in FIGS. 11 and 12, the end plate 192 also is provided with an array of strand receiving openings 196 which are in longitudinal alignment with the above-described openings 146 in the left end plate 132. The strand openings 196 are countersunk on the inward end plate face 192a (FIG. 12), to facilitate the placement of the reinforcing strands 250 within the openings. Additionally, the openings 196 also include chuck-releasing bushings 198 which are preferably identical, in construction and function, to the above-described bushings 148 on the left mold end plate 132. Thus, as shown in FIGS. 17, 18 and 20, the bushings 198 operate to guide the reinforcing strand 250, and to control the gripping of the strand, during the strand placement and tensioning operations.

The mold end assembly 190 further includes a chuck plate 200 which is similar to the above-described chuck plate 150. In this regard, guide pins 202 extend from the adjacent end plate 192 through apertures 204 on the chuck plate 200, thereby slidably mounting the chuck plate 200 outwardly from the end plate 192. In addition, compression springs 208 are positioned between the heads 202a of the guide pins 200 and the outward chuck plate face 200b, to bias the chuck plate 200 toward the end plate 192.

The chuck plate 200 embodying the features of the present invention also includes a plurality of strand-receiving openings 206 which are longitudinally aligned with the strand-receiving openings 196 in the end plate 192. As illustrated in FIGS. 10 and 11, a strand chuck 210, preferably constructed the same as the above-described chucks 160, is mounted on the chuck plate 200 in alignment with each of the strand-receiving openings 206. As in the chucks 160, the strand chucks 210 thus preferably comprise a chuck housing 211 which contains wedge-shaped jaws 212 spaced around a chuck throat 213. Also, a compression spring 214, retained by a chuck cap 216, urges the jaws 212 downwardly and inwardly toward the chuck throat 213.

Due to the above-described arrangement of the right chuck plate 200, the rightward free ends of the reinforcing strand 250 can be extended outwardly through the aligned openings 196 and 206, in the end plate 192 and the chuck plate 200, to be releasably gripped by the jaws 212 of the strand chucks 210. Further, as shown in FIG. 20, the strand bushings 198 are engagable with the chuck jaws 212 to selectively maintain the jaws in an "unlocked" condition, as described above with respect to the strand chucks 160. Similarly, the bushings 198 can be retracted from the chuck jaws 212, from the outward position shown in FIG. 17 to the inward position shown in FIG. 18. In the latter arrangement, the chuck jaws 212 are activated and maintained in a "ready" position for gripping the strand 250 and preventing the inward movement of the strand from the chuck throat 213.

As shown in FIGS. 10–12, the chuck plate 200 likewise includes an upper guide roller 218 and a lower guide roller 220. During the feeding, placement and tensioning of the strang 250, the rollers 218 and 220 function to maintain the chuck plate in the proper position with respect to the adjacent end plate 192, and also maintain the mold end assembly 190 in the proper position with respect to the mold body 110.

The chuck plate 200 embodying the features of the present invention is further provided with a channel 222 on the inward face 200a of the chuck plate. In contrast to the channel 172 in the chuck plate 150 (FIG. 9), the channel 222, preferably triangular in configuration, is cut within the chuck plate face 200a so as to define two longitudinally spaced bearing surfaces 224 and 226. By this arrangement, the bearing surfaces 224 and 226, and the inward chuck plate face 200a, together define a three-stepped abutment surface between the chuck plate 200 and the adjacent end plate 192. The channel 222 thereby adapts the mold end assembly 190 for receiving a slidable locking plate 230 between the adjacent chuck plate 200 and end plate 132.

As seen in FIGS. 10–12, the locking plate 230 incorporated in the mold end assembly 190 is also preferably triangular in configuration so that the plate 230 can be readily received within the channel 222. A vertical slot 232 in the plate 230 cooperates with mounting pins 234, on the adjacent end plates 192, to permit the plate 230 to slide vertically between the chuck plate 150 and the end plate 192. The top portion of the locking plate 230 also includes recesses 236 for permitting the plate 180 to move upwardly between the chuck plate 200 and end plate 192 without interferring with the strands 250 or the strand bushings 198. A cam roller 238, preferably identical to the above-described cam roller 188, is mounted upon a roller pin 239 at the lower portion of the locking plate 230. The cam roller 238 is thereby positioned for engagement with a cam track or other type of actuating device for controlling the vertical positioning of the locking plate 230.

As shown in FIGS. 10 and 13, when the locking plate 230 is in the lowermost position the plate 230 is engaged between the outward end plate face 192b and the first recessed bearing surface 224 on the chuck plate 200. In this "unlocked" position, the jaws 212 of the chucks 200 are deactivated or unlocked by the bushings 198, as seen in FIG. 20, so that the strand 250 can be fed either inwardly or outwardly through the strank chuck throats 213. As the cam roller 238 is engaged to raise the locking plate 230 upwardly within the chuck plate channel 222, the locking plate 230 will move upwardly into an intermediate position, as shown in FIG. 14, into engagement between the end plate face 192b and the second recessed bearing surface 226 on the chuck plate 200. As seen in FIG. 18, in this "ready" position, the bushings 198 are retracted from the jaws 212 of the chucks 200, and the chucks 200 are prepared for gripping the ends of the reinforcing strands 250. Also, the locking plate 230 can be moved upwardly into engagement between the opposed faces 192b and 200a of the adjacent end and chuck plates 192 and 200, respectively. In this latter "locked" position, the chuck plate 200 is further separated from the end plate 192 by a predetermined distance equal to the depth of the chuck plate recess 226.

Finally, the chuck plate 200 embodying the features of the present invention includes suitable means for applying force to the chuck plate to separate the plate from the adjacent end plate 192 during the strand tensioning operations. In this regard, the chuck plate 200 includes an outwardly projecting tensioning post 240 which is rigidly secured, such as by suitable welds, to the outward chuck plate face 200b. As seen from FIGS. 10–12, the post 240 includes gripping slots 242 which function to connect the post 240 to a pulling or tensioning head. By this arrangement, an outward pulling force can be applied to the post 240 through the slots 242 to move the chuck plate 200 outwardly away from the adjacent end plate 192. Reinforcing strands 250, extended between the chucks 160 and 210, can thereby be subjected to a pre-tensioning force of desired magnitude by moving the chuck plate 200 outwardly a predetermined distance.

The portable molding apparatus 100, illustrated in FIGS. 1–23, is particularly adapted for tensioning the strand 250 by employing the force-measured strand tensioning method in accordance with this invention. As explained in detail below, the components of the above-described mold end assemblies 130 and 190 are accordingly dimensioned to permit the strand 250 to be readily placed within the mold 100, and to also permit the force-measured strand tensioning method to be followed.

A modified portable molding apparatus 100' is illustrated in FIGS. 24 and 25. In contrast to the above-described mold 100, the modified mold 100' is particularly adapted to tension the reinforcing strand 250 by employing the elongation-measured strand tensioning process in acordance with this invention.

In this modified mold 100' the mold body 110 and the two-position mold end assembly 130 (not shown) are the same as described above. The right mold end plate 192' is also the same as the above-described end plate 192 on the mold 100. Moreover, the construction and operation of the three-position mold end assembly 190' is substantially the same as the above-described end assembly 190. Thus, the modified end assembly 190' includes a chuck plate 200' which has strand chucks 210', a recessed channel 222' defining stepped bearing surfaces 224' and 226' and chuck plate guide rollers 218' and 220'. The end assembly 190' further includes a verticaly slidable locking plate 230', mounted between the opposed faces of the end plate 192' and chuck plate 200'.

The three-position end assembly 190' of the modified mold 100' differs from the above-described end assembly 190 principally in the dimensions of the locking plate 230' and of the channel 222' in the chuck plate 200'. In this modified mold 100', the width of the locking plate 230' and the depth of the bearing surfaces 224' and 226' in the chuck plate 200' are selected so that the modified end assembly 190' functions to tension the strands 250 by measuring the elongation of the strands, rather than measuring the tensioning force applied thereto.

FIG. 26 illustrates an additional modification of the portable molding apparatus in accordance with this invention. In this modification, the mold 300 includes movable mold end assemblies 330 and 390 which adapt the mold 300 for use with either the force-measured or elongation-measured strand tensioning methods in accordance with this invention. To acomplish such versatility, both of the mold end assemblies 330 and 390 in this modification are three-position assemblies, in that the components of both assemblies can be adjusted to maintain three positions ("unlock," "ready" and "lock") during placement and tensioning of the reinforcing strands 250.

The mold body 310 of the modified mold 300 is preferably identical to the above-described mold body 110, and thus will not be discussed in further detail.

Referring to FIG. 27 more specifically, the left mold end plate assembly 330 includes an end plate 332 which is movably mounted on the mold body 310 by means of the guide rods 334. The end plate 332 is provided with a plurality of countersunk strand-receiving openings 336, each of which includes a strand bushing 338. A chuck plate 350 is slidably mounted outwardly from the end plate 332, and includes strand-receiving openings 356 which are longitudinally aligned with the end plate openings 336. Similarly, the chuck plate 350 has a strand chuck 360 (as described above) aligned with each opening 336, to releasably grip the reinforcing strand 250, and further has a pair of guide rollers 368 and 370 for controlling the positioning of the end assembly 330.

Chuck plate 350 also includes a triangular channel 372 which defines longitudinally spaced bearing surfaces 374 and 376. These surfaces 374 and 376, together with the inward face 350a of chuck plate 350, in turn define a three-stepped abutment surface between the chuck plate 350 and the end plate 332. By this arrangement a vertically slidable locking plate 380, similar to the above-described locking plates 180 and 230, can be positioned within the chuck plate channel 372.

The modified right mold end assembly 390 comprises an end plate 392 mounted on guide rods 394 and having similar strand-receiving openings 396 and bushings 398. In addition, a slidably mounted chuck plate 400 is provided adjacent the end plate 392, and includes strand-receiving openings 406 and chucks 410. A pair of guide rollers 418 and 420 are also included on the chuck plate 400 for controlling the positioning of the plate 400. Finally, the chuck plate 400 includes a channel 422, providing recessed bearing surfaces 424 and 426, which receives a slidable locking plate 430. As in the left end assembly 330, the bearing surfaces 424 and 426, and the inward face 400a of the chuck plate 400, define a three-stepped abutment surface between the end and chuck plates 392 and 400, respectively.

The operation of the modified mold apparatus 300 during the placement and tensioning of the reinforcing strand is very similar to the operation of the above-described molds 100 and 100'. Again, the principal modification in the mold 300 is in the dimensioning of the locking plates 380 and 430 and the chuck plate channels 372 and 422. As explained further hereinbelow, these dimensions for the mold 300 are selected so that the mold 300 can be selectively employed to tension reinforcing strand by either the force-measured or elongation-measured method of the present invention.

STRAND PLACEMENT APPARATUS

Another aspect of this invention relates to the provision of a system for rapidly and accurately placing lengths of reinforcing strand 250 within the above-described portable molding apparatus with a minimum of manual handling. Such a strand placement system is further designed to cooperate with the portable molding apparatus in accordance with this invention to manufacture prestressed concrete members on an automated mass production basis.

An exemplary embodiment of the reinforcing strand placement system in accordance with this invention is illustrated in FIGS. 28 through 41. As with the portable mold 100, the illustrated embodiment of the placement system is also particularly adapted for use in the manufacture of a current type of concrete railway ties. Hence, as required by the current specifications for the exemplary type of ties set by the American Association of Railroads, the illustrated placement system is designed to place four lengths of wire reinforcing strand within a suitable tie mold, such as the above-described mold 100.

Referring initially to FIGS. 27 through 33, the strand placement device or system in accordance with this invention comprises a placement station 600 including a strand placement head assembly 500. The placement station 600 embodying the features of the present invention receives a portable mold, such as mold 100, and maintains the mold in position with respect to the head 500 so that the head assembly 500 is operable to place the reinforcing strands 250 within the mold.

Referring to FIGS. 32–37 more specifically, the placement head assembly 500 includes a pair of moveable heads 502 and 504, each of which is constructed to form an elongated and inverted channel, open at the lower portion thereof. The heads 502 and 504 are substantially similar in construction so that each head receives and supports an equal portion of the reinforcing strand 250 during the strand placement operation. Furthermore, as indicated in FIGS. 36 and 37, the heads 502 and 504, in accordance with this invention, are dimensioned so as to fit readily within the cavity of a mold body such as body 110.

In order to mount the strand placement heads 502 and 504 in the proper position at the placement station 600, each head includes brackets 506 which slidably engage with an elongate supporting frame structure 508. By means of this sliding connection with the frame structure 508, the heads 502 and 504 are mounted at the placement station 600 vertically above the mold into which the strands 250 are to be placed. Additionally, hydraulic actuating pistons 510 are connected between the heads 502 and 504 and the frame structures 508 so that the heads may be moved or translated upon the frame structure 508 during the strand placement operation. These actuating pistons 510 preferably are two-way pistons so that the longitudinal ocientation of the heads 502 and 504 can be controlled by either extending or retracting the pistons 510.

The placement heads 502 and 504 in accordance with this invention also include means for receiving and releasably supporting the strands 250 for placement within the mold 100. Thus, as fully illustrated in FIGS. 34 and 37–40, each placement head includes a plurality of longitudinal strand-receiving channel members 514 and releasable elongate closure members 516. The channels 514 are dimensioned to have an internal diameter closely corresponding to the outer diameter of the reinforcing strands 250 so that the strands can be received and accurately spaced within the heads 502 and 504. Further, the channels 514 extend for the full length of each of the heads 502 and 504, and thereby control the positioning of the strands 250 throughout the full strand length. As clearly illustrated in FIGS. 34, 37 and 40, each of the channels 514 are open along the lower portion so that the strands 250 can be lowered away from the heads 502 and 504 after the strand placement operation is completed.

As seen in FIGS. 37–39, the closure members 516 preferably have the same longitudinal dimension as the channels 514 and are movable into engagement with the open lower portion of each channel 514. By this arrangement, the members 516 close the channels 514 and thereby support the strands 250 throughout the length of the placement heads 502 and 504.

Each of the placement heads 502 and 504 is provided with a pair of closure-actuating linkages 520 in order to releasably maintain the closure members 516 in position to support the reinforcing strands 250. As shown in FIGS. 34, 37, and 38, the linkage 520 is connected to the closure members 516, and is supported within the heads 502 and 504 by means of pivot pins 522 extending between spaced lateral head walls 524. In addition, each of the linkages 520 includes a hydraulic actuating cylinder 526 for opening or closing the closure members 516. The cylinders 526 are operable to releasably maintain the members 516 in a closed position against the channels 514, as illustrated in FIGS. 34 and 37. The cylinders 526 are further operable, through the linkages 520, to move the closure members 516 into an open position, as illustrated in FIG. 40. In this latter position, the closure members 516 are retracted from the strand channels 514, and the strand 250 can thereby be released from the channels 514. In the illustrated embodiment, the placement heads 502 and 504 include side openings 528 which provide space for the actuation of the cylinders 526, and which also provide means for inspecting and repairing the cylinders 526 and the actuating linkages 520.

The strand placement station 600 in accordance with this invention includes a suitable strand feeding device in order to feed the desired lengths of reinforcing strand 250 into the above-described strand placement head assembly 500. Such a strand-feeding device (not shown) would feed the reinforcing strand 250 from a coil into suitable guide tubes, such as indicated by the reference numeral 530 in FIGS. 32 and 33, and then directly into the strand-receiving channels 514. When the feeding device has driven the desired length of the strand 250 into the placement heads 502 and 504 (such as to a strand length illustrated in FIGS. 32 and 33) a suitable limit switch or the like (not shown) is energized by the strands 250 to stop the strand feeding operation. After the strands 250 are positioned within the heads 502 and 504, a strand-cutting saw, such as the circular saw 532 illustrated schematically in FIGS. 32 and 33, can be used to cut the strands to the desired length.

The strand placement station 600 preferably handles the portable molds 100 in the manner fully described in the above-mentioned copending application of Messrs. Margolin, Gallagher and Glazer, Ser. No. 721,834.

Accordingly, the portable molds 100 are individually conveyed to the strand placement station 600 by means of a mold conveyor 700. The placement station 600 then operates to position the mold 100 laterally and longitudinally and to elevate the mold 100 into engagement with the above-described strand placement head assembly 500.

As fully described in said copending application Ser. No. 721,834, the mold conveyor 700 carries a plurality of portable molds 100 along a predetermined path (as indicated by the arrow in FIG. 27), and delivers the individual molds to the strand placement station 600 at predetermined intervals. The conveyor 700 includes a conveyor drive chain 702 provided with spaced mold-receiving saddles 704, as illustrated in FIG. 28. The mold saddles 704 receive the bottom portions of the molds 100 and secure the molds to the conveyor 700. Additionally, a chain track 706 assures that the drive chain 702 will convey the molds 100 along the desired path of travel. The conveyor 700 also includes a pair of parallel roller beds 707 made from a plurality of transversely extended rollers 708, as clearly illustrated in FIG. 27. These rollers 708 engage with the molds 100 and support the molds along the entire length of the mold conveyor 700. Finally, the mold conveyor 700 is provided with a suitable frame structure 712 for supporting the conveyor chain 702 and the rollers of beds 707.

As shown in FIGS. 27, 32 and 33, the strand placement station 600 includes a pair of mold elevators 602 and 603 located along the sides of the mold conveyor 700. The elevators 602 and 603 are designed to engage the ends of the portable mold 100 and lift the mold upwardly from the conveyor 700 into engagement with the strand placement head assembly 500. Accordingly, the elevators 602 and 603 include hydraulically actuated elevator platforms 604 and 605, mounted on hydraulic lift cylinders 606. Guide posts 608 adjacent the lift cylinders 606 insure that the elevator platforms remain in the desired position at all times during the strand placement operation. The elevator platforms 604 and 605 further include roller beds 610 for engaging and supporting the ends of the portable mold 100. The mold 100 thus can be lifted from the conveyor 700, after the mold has engaged with the roller beds 610, by actuation of the lift cylinders 606.

The strand placement station 600 also includes means for controlling the transverse positioning of the portable mold 100 as the mold is lifted vertically from the conveyor 700. In this connection, the placement station 600 includes a pair of brackets 612 secured to the placement head structure 508. As shown in FIGS. 34 and 37, the brackets 612 extend downwardly toward the elevator platforms 604 and 605, and have open lower ends for receiving the portable mold 100. The brackets 612 are dimensioned to engage with the mold 100, and urge the mold into the desired transverse position, as the elevator platforms 604 and 605 are raised from the lower position, as shown in FIG. 34, to the raised position, such as shown in FIG. 37.

The portable molding apparatus 100, in accordance with this invention, is designed so that the mold end assemblies 130 and 190 are normally in the "unlocked" position, with the strand chucks deactivated, before the strands 250 are placed within the mold. Thus, the end assemblies 130 and 190 must be adjusted to the "ready" position, with the strand gripping chucks thereon activated, as the mold 100 approaches the strand placement station 600. To accomplish this, the strand placement station 600 includes mold end positioning devices 620 and 640, which are mounted on the sides of conveyor 700 in front of the elevators 602 and 603.

As shown in FIGS. 27 and 29, the positioning means 620 include a U-shaped channel member 622 positioned to receive the mold end assembly 130 as the mold 100 is carried by the conveyor 700. The inward edge of the channel 622 is provided with grooves 624 and guide rails 626 and 628, for engaging the end plate 132 of the mold end assembly 130 and thus maintaining the plate 132 in the desired longitudinal position with respect to the mold body 110.

Further, the channel member 622 is provided with roller tracks 630 and 632 for engaging the guide rollers 168 and 170 on the mold chuck plate 150. As shown in FIG. 31, the roller tracks 630 and 632 extend parallel to the path of the conveyor 700, but include outwardly-directed cam surfaces 630a and 632a. In operation, the cam surfaces 630a and 632a engage with the chuck plate rollers 168 and 170 to move the chuck plate 150 outwardly with respect to the adjacent end plate 132 as the mold 100 is carried through the channel member 622. By this arrangement, the chuck plate 150 and the end plate 132 are spaced so that the mold end assembly 130 can be adjusted from an "unlocked" position to a "ready" position.

In order to adjust the end assembly 130 from the "unlocked" to the "ready" position, the channel member 622 is further provided with a locking plate cam track 634, as shown in FIGS. 27 and 30. The cam track 634 extends longitudinally along the path of the conveyor 700, and is positioned to engage with the cam roller 188 on the locking plate 180. The forward portion of cam track 634 is provided with an angled cam riser 635 (FIG. 30) for actuating the locking plate 180. The vertical lift of the cam riser 635 is calculated so that the riser will engage the cam roller 188 on the locking plate 180, and move the locking plate from the lowermost "unlocked" position (FIGS. 7 and 13) to an upward "ready" position between the chuck plate 150 and the end plate 132. The cam riser 635 is positioned behind the angled portions 630a and 632a of the chuck plate cam tracks 630 and 632, so that the locking plate 180 is forced into such "ready" position after the chuck plate 150 is spaced from the adjacent end plate 132.

The mold end positioning device 640 (FIG. 27) is substantially similar in design and function to the positioning device 620. Thus, the device 640 includes a U-shaped channel member 642 for receiving the right mold end assembly 190 as the mold 100 is carried along the path of the conveyor 700. The channel 642 is also provided with suitable grooves and guide rails (not shown), similar to the above-described grooves 624 and guide rails 626 and 628, for maintaining the mold end plate 192 in the desired position with respect to the mold body 110. Upper and lower roller tracks 650 and 652 are further provided on the channel 642 for engaging the guide rollers 218 and 220 on the chuck plate 200. As in the above-described channel member 622, these roller tracks 650 and 652 angle outwardly to provide outwardly directed cam surfaces, such as shown as surface 650a in FIG. 27, which move the chuck plate 200 outwardly from the adjacent end plate 192 as the conveyor 700 moves the portable mold through the channel member 642. The chuck and end plates of the mold end assembly 190 are thereby also adjusted so that the end assembly 190 is changed from an "unlocked" position to a "ready" position.

To accomplish this change of position, the channel member 642 includes a locking plate cam track (not shown), similar to the cam track 634. Such a cam track engages the cam roller 238 of the locking plate 230 and moves the locking plate 230 from the "unlocked" position, as shown in FIGS. 10 and 13 to an intermediate "ready" position, as shown in FIG. 14. Since the vertical distance between the "unlocked" and "ready" positions for the locking plate 230 is less than the comparable distance for the locking plate 180, the riser portion of the locking plate cam track on this channel member 640 will have a correspondingly smaller height than the riser 635.

The strand placement station 600 also includes means for controlling the longitudinal positioning of the mold body 110 and the mold end assemblies 130 and 190, as the mold 100 is raised vertically from the conveyor 700. The elevator platforms 604 and 605 thus include positioning devices 660 and 680, similar to the positioning devices 620 and 640. As seen in FIGS. 27 and 32, the devices 660 and 680 generally comprise U-shaped channel members 662 and 682 which are designed to receive the mold end assemblies 130 and 190, respectively. The channel member 682 is larger than the member 662 (FIG. 32), to accommodate the tensioning post 240 provided on the end assembly 190.

Both of the channel members 662 and 682 are provided with grooves 664 and guide rails 666 for receiving the adjacent mold end plate 132 or 192. In addition, channel members 662 and 682 include roller tracks 670 and 672 for controlling the positioning of the adjacent mold end assembly chuck plate 150 or 200 by engagement with the guide rollers on the chuck plates. Cam tracks 674 and 676 are also provided on the channels 662 and 682 for engaging the adjacent locking plate cam roller 188 or 238, and thereby maintain each of the locking plates in the above-described "ready" position. As illustrated in FIGS. 27 and 30, the chuck plate roller tracks and locking plate cam tracks on the adjacent positioning devices 620 and 660, and on the adjacent positioning devices 640 and 680 preferably project outwardly beyond the respective positioning devices to form substantially continuous tracks for controlling the positioning of the mold end assemblies 130 and 190.

In accordance with this invention, the mold positioning devices 660 and 680 at the strand placement station 600 are adapted to selectively close the mold end assemblies 130 and 190 against the respective ends of the mold body 110. To accomplish this closing operation, each of the elevator platforms 604 and 605 includes a hydraulic push rod 684 extended between the platform and the adjacent positioning channel 662 or 682 (FIGS. 27 and 32). The channels 662 and 682 are slidably mounted on the adjacent elevator platform by means of bearing sleeves 686 and guide rods 688. The guide rods 688 are secured to the elevator platform, and thereby assure that channel members 662 and 682 translate the mold end assemblies 130 and 190 in a substantially longitudinal direction with respect to the mold 100. In the illustrated embodiment, the mold end positioning devices 660 and 680 can be moved from an outward position aligned with the mold end positioning devices 660 and 640 (FIGS. 27, 32 and 33) to an inward position (FIG. 36) where the end assemblies 130 and 190 are closed against the mold body 110.

The strand placement station 600 and the placement head assembly 500 can be modified to facilitate tensioning of the strands 250 when an elongation-measured tensioning method is employed. This modification is illustrated by the strand placement head assembly 500A and strand placement station 600A shown in FIGS. 54 through 56 of the drawings.

Referring to FIGS. 54–56, the station 600A is preferably identical to the above-described station 600. The major components of the modified strand placement head assembly 500A are also preferably identical to the components of the head assembly 500. The principal modification in the head assembly 500A is the incorporation of strand gripping means 550 within the movable placement head 504A. The gripping means 550 permits the head assembly 500A to initially pretension the strands 250 within the mold 100. Such initial pretensioning facilitates the final tensioning of the strands 250 by means of an elongation-measured tension method, by insuring that the strands have been pulled straight and that the chucks of the end assemblies 130 and 190 are seated properly against the strands 250.

Referring to FIGS. 54–56 more specifically, the gripping means 550 is located in the end portion of the placement head 504A so as to grip the rightward free ends of the strands 250. The gripping means 550 comprises serrated gripping knives 552 and grooved dead-knives 554, aligned with the strand receiving channels 514. As illustrated in FIG. 55, the strands 250 thus can extend within the groove in the dead-knives 554, and the serrated knives 552 can be closed against the strand.

In order to move the knives 554 into such gripping engagement with the strands 250, the knives 554 are connected to a suitable actuating linkage 556. As seen in FIGS. 55 and 56, the linkage 556 is preferably identical to the actuating linkage 520 joined to the channel closure members 516. Further, a hydraulic actuating piston 558, similar to the piston 526, is operable to move the linkage 556 from a retracted position, (FIG. 55) with the knives 552 gripping the strands 250 to an extended position which releases the grip of the knives 552.

The initial pretensioning of the strands 250 by using the placement head assembly 500A is accomplished by moving the modified head 504A outwardly (to the right in FIG. 54) with the end portion of the strands 250 secured by the gripping means 550. Such movement of the head 504A thereby elongates the strands 250, since any rightward movement of the strands is prevented by the strand chucks 160 on the left end assembly 130. When the gripping means 550 is released, the right strand chucks 210 then seat against strand 250, with a slight loss of tension in the strands. Accordingly, this initial strand pretensioning imposed by the movement of the placement head 504A increases the accuracy of the final pretensioning load in the strands by insuring that the strands have been pulled straight before the elongation-measured final tensioning operation is performed, as explained further hereinafter.

STRAND TENSIONING APPARATUS

An additional aspect of the present invention relates to a system for applying the desired pretensioning force to the reinforcing strands 250 after the strands are positioned within a portable molding apparatus. This invention thus provides a strand tensioning system useful for applying the desired tension to the strands 250 by either a force-measured or elongation-measured tensioning method.

A strand tensioning station 800 which is particularly adapted to pretension the strands 250 by measurement of the force applied thereto is illustrated in FIGS. 42–48. As in the strand placement station 600, this tensioning station 800 includes a pair of elevators 802 and 803 having elevator platforms 804 and 805. Hydraulic lift cylinders 806 operate to raise or lower the platforms 804 and 805 during the strand tensioning operation, and guide posts 808 assure that the platforms are properly positioned. By this arrangement, the elevator platforms 804 and 805 can receive the ends of the portable mold 100, on platform roller beds 810, and the lift cylinders 806 can be energized to lift the mold 100 from the mold conveyor 700.

The elevator platforms 804 and 805 also include guide tracks 812 extending substantially parallel to the path of the mold conveyor 700. As indicated in FIGS. 42–46, the tracks 812 engage with the adjacent end plates 132 and 192 of the mold end assemblies 130 and 190 as the mold 100 is conveyed into the tensioning station 800. The tracks 812 also engage with and support the adjacent cam rollers 188 and 238 on the mold end assembly locking plates 180 and 230, respectively. Thus, the guide tracks 812 longitudinally position the mold 100 in the placement station 800, and also control the positioning of the chuck plates 150 and 200 with respect to the adjacent mold end plates 132 and 192. The tensioning station 800 may also be provided with brackets 612 which engage the mold 100 to position the mold transversely as the elevators 802 and 803 are raised.

The strand tensioning station 800 also includes a tensioning head 820 for gripping and tensioning the strands 250 by applying a measured tensioning force thereto. As seen in FIGS. 42 and 44, a pair of hydraulic tensioning cylinders 822 is incorporated in the head 820 for applying a measured tensioning force to two of the strands 250. A U-shaped fork 824 is joined to the cylinders 822 and is designed to extend over the mold end assembly 190, into engagement with the end plate 192. Additionally, each of the cylinders 822 has a tensioning chuck 826 positioned within the fork 824 for alignment with two diagonally-opposed strands 250a, as seen in FIG. 42. These strand chucks 826 preferably have the same construction as the chucks 160 and 210, and are oriented in the fork 824 so that the strands 250a can extend outwardly (rightward in FIG. 44) into the chucks but are gripped by the chucks and retrained from any inward movement. By this arrangement, the strands 250a will be engaged by the chucks 826 as the fork 824 is moved inwardly into contact with the adjacent mold end plate 192. Subsequent actuation of the cylinders 822, to pull the chucks 826 outwardly (rightward in FIG. 44), thereby subjects the reinforcing strands 250a to a pretensioning load. A suitable dynamometer (not shown) or other measuring device can be used to assure that the pull of cylinders 822 reaches the desired force level before being released.

As seen in FIGS. 44–46, the tensioning head 820 is mounted on the elevator platform 805 by means of guide rods 828 and guide sleeves 829. In addition, a double-acting hydraulic cylinder 830 is connected between the elevator platform 805 and the head 820. The cylinder 830 thus can be activated to translate the head 820 on the elevator platform, from an outward position (FIGS. 42, 44 and 45) into an inward position (FIG. 46). In such an inward position, the fork 824 engages the adjacent end plate 192 along the bearing surfaces 824a (FIG. 47), and the strands 250a are gripped by the tensioning chucks 826. Hence, with the head 820 in this latter position (FIGS. 46 and 47), the cylinders 822 can be actuated to apply a predetermined tensioning force to the strands 250a through the chucks 826.

In the illustrated embodiment of this invention, a second station 800A is provided for tensioning the other two diagonally opposed strands 250b. The construction of station 800A, including a tensioning head 820A, is similar to the construction of the tensioning station 800, with the exception that the head 820A is arranged to engage with and tension strands 250b.

Thus, as shown in FIGS. 43 and 48, the head 820A is provided with tensioning chucks 826a aligned with the strands 250b, and tensioning cylinders 822a. The cylinders 822a are connected to the chucks 826a, and operate to apply a predetermined tensioning force to strands 250b.

FIGS. 49 through 53 illustrate a modified strand tensioning head in accordance with this invention which is adapted to tension the strands 250 by measuring the resulting strand elongation. This modified tensioning head, generally indicated by the reference numeral 900, is positioned at a strand tensioning station 800B. With the exception of the tensioning head 900, the strand tensioning station 800B is preferably identical to the tensioning stations 800 and 800A.

Referring to FIGS. 49–53 more specifically, the tensioning head 900 is mounted upon the elevator platform 605 and includes a U-shaped channel member 902 for receiving the mold end assembly 190. In operation, the channel member 902 is capable of engaging the adjacent mold end plate 192 along the bearing surfaces 902a, as indicated in FIG. 51. The tensioning head 900 also includes a bifurcated tensioning member 906, having inward projections 908. As illustrated in FIGS. 50 and 53, the projections 908 connect with the tensioning post 240 on the end plate assembly 190 by slidably extending into the post grooves 242. In turn, the member 906 is connected by a piston rod 909 to a hydraulic tensioning cylinder 910.

By this arrangement of the tensioning head 900, the actuation of the cylinder 910 to retract the piston rod 909 pulls the tensioning member 906 outwardly from the mold end assembly 190. With the channel member 902 in engagement with the mold end plate 192, the cylinder 910 thereby urges the chuck plate 200 outwardly from the end plate 192, to tension the four strands 250 simultaneously. Since each of the strands is gripped by the strand chucks 210 on the chuck plate 200, the separation of the chuck plate 210 from the end plate 192 simultaneously subjects the four reinforcing strands 250 to a pretensioning load.

To tension the strands 250 to the desired load level, the hydraulic cylinder 910 of the tensioning head 900 can be actuated until the strands 250 have been extended or elongated a predetermined distance. Next, the locking plate 230 of the end assembly 190 can be raised into engagement between the adjacent chuck plate 200 and end plate 192, to lock the plates in a spaced position and thereby maintain the elongation of the strands 250.

Suitable means for actuating the locking plate 230 in the above-described manner is shown in FIGS. 52 and 53. The actuating means comprises a remotely-controlled hydraulic cylinder 920 provided with a push rod 922, positioned within the channel member 902 adjacent the locking plate 230. In operation, after the tensioning head 900 has been operated to space the chuck plate 200 from the end plate 192, and thereby elongate the strands 250 the desired distance, the cylinder 910 is actuated to raise the locking plate 230 from a "ready" position, as shown in full lines in FIG. 52, to the "locked" position between the adjacent chuck and end plates of the mold end assembly 190. This latter "locked" position for the locking plate 230 is illustrated by the phantom lines in FIG. 52, and is also illustrated in FIG. 15.

The modified tensioning head 900 in accordance with this invention is usable in a force-measured strand tensioning method, to compensate for the tensioning loss resulting from the seating of the strand chucks, as described above. In addition, the tensioning head 900 can be employed with the three-position mold end assemblies of the modified molds 100' and 300 as, illustrated in FIGS. 24–26, for tensioning the strands 250 by an elongation-measured tensioning method.

STRAND PLACEMENT OPERATION

The operation of the portable molding apparatus and strand placement apparatus in accordance with this invention will be described with reference to the placement of the four reinforcing strands 250 within the mold 100, as illustrated in FIGS. 1 through 23. However, it will be appreciated by those skilled in the art that the strand placement operation would be substantially the same with the modified molds 100′ and 300, as illustrated in FIGS. 24–26, or with other suitable portable molds.

Referring initially to FIG. 27, placement of the reinforcing strands 250 within the mold 100 is initiated by driving the mold 100 toward the strand placement station 600 by means of the mold conveyor 700. As the mold 100 approaches the station 600, the mold end assemblies 130 and 190 are arranged in the "unlocked" position, with the respective locking plates 180 and 230 arranged in the lowermost positions within the respective chuck plate channels 172 and 222 (FIGS. 7, 10 and 13). In this initial "unlocked" position, the bushings 148 and 198 on the mold end plates 132 and 192, respectively, are engaged with the chuck jaws 162 and 212 thereby unlocking or deactivating the strand chucks 160 and 210 (FIGS. 17, 19 and 20). This unlocking operation is accomplished by arranging the bushings 148 and 198, the locking plates 180 and 230, and the chuck plate bearing surfaces 174 and 224 so that the bushings 148 and 198 project into the strand chucks 160 and 210 as the locking plates 180 and 230 are engaged with the bearing surfaces 174 and 224, respectively. In the specific illustrated embodiment, the width of the locking plates 180 and 230 is ¾ inch, and the depth of the bearing surfaces 174 and 224 is 9/16 inch. Thus, in the "unlocked" position, the chuck plates 150 and 200 are spaced 3/16 of an inch from the adjacent end plates 132 and 192, respectively. The length of the bushings 148 and 198 is selected so that the bushings extend outwardly into engagement with the strand chuck jaws 162 and 212 with the chuck end plates so positioned (FIGS. 19 and 20). Similarly, the illustrated strand 250 has a diameter of seven-sixteenths of an inch (7/16″).

As the mold 100 approaches the placement station 600 (FIG. 27) the mold end assemblies 130 and 190 move through the positioning means 620 and 640. The mold end plates 132 and 192 then engage with the grooves 624 and guide rails 626 and 628 provided in these positioning means 620 and 640 (FIGS. 27 and 29), and are thereby guided into the desired position with respect to the mold body 110. Movement of the end assemblies 130 and 190 through the positioning means 620 and 640 also brings the chuck plate rollers 168 and 170 into engagement with the leftward roller tracks 630 and 632, and the rollers 218 and 220 on the right chuck plate 200 into engagement with the rightward tracks 650 and 652 of the right positioning means 640 (FIGS. 13, 14, 27 and 31). Thus, upon further movement through the positioning means 620 and 640, the angled track surfaces 630a, 632a, 650a and 652a (FIGS. 27 and 31), force the chuck plates 150 and 200 outwardly from the adjacent mold end plates 132 and 192, and condition the mold end assemblies for adjustment from the "unlocked" position (FIG. 13) to the "ready" position (FIG. 14).

As seen in FIG. 30, movement of the mold 100 through the positioning means 620 and 640 also brings the locking plate rollers 188 and 238 into engagement with the roller cam tracks 634. The cam risers 635 on the tracks 634 then operate to raise the locking plates 180 and 230 from the unlocked position (FIG. 13) to the ready position (FIG. 14). In this ready position, the locking plate 180 engages between the opposed faces of the chuck plate 150 and the end plate 132, and the locking plate 230 engages between the end plate 192 and the recessed bearing surface 26. The chuck plates 150 and 200 are thereby spaced an additional 9/16 of an inch (the depth of chuck plate surfaces 172 and 224) from the adjacent end plates. In this "ready" position, the strand bushing 148 and 198 are retracted from the jaws of the strand chucks 160 and 210 (FIGS. 18 and 21) so that the chucks are adapted to grip the wire strand 250.

As seen in FIGS. 27, 32 and 33, the movement of the mold 100 is also controlled so that the end assemblies 130 and 190 are retained in the above-described "ready" position when the mold 100 reaches the strand placement station 600. This is accomplished by the movement of the mold end assemblies 130 and 190 into engagement with the positioning devices 660 and 680 as the mold 100 is carried onto the elevators 602 and 603 of the strand placement station 600. As seen in FIG. 32, the positioning devices 660 and 680 maintain the end assemblies 130 and 190 in the "ready" position, and also space the end assemblies in an open position with respect to the mold body 110. The end assemblies 130 and 190 are thereby prepared to receive the reinforcing strands 250.

As the mold 100 is approaching the strand placement station 600, the strand placement head assembly 500 is simultaneously receiving suitable lengths of reinforcing strand 250 for placement within the mold. As shown in FIG. 32, the action of the head assembly 500 is initiated by shifting the placement heads 502 and 504 on the supporting structure 508, by means of the actuating pistons 510, into a rightward position adjacent the strand feeding tubes 530. The linkages 520 in the heads 502 and 504 are also actuated by the cylinders 526, to move the closure members 516 into a closed position against the strand channels 514 (FIG. 37). The translation of the heads 502 and 504 on the supporting structure 508 thereby aligns the closed channels 514 with the strand feeding tubes 530, and the strand 250 can be fed into the channels 514. After the desired length of the strands 250 has been fed into the placement heads 502 and 504, a limit switch (not shown) stops the strand feeding operation, and the saw 532 can be actuated, to cut the strands 250 adjacent the placement head 504.

With the four lengths of strands 250 positioned in the placement heads 502 and 504, the pistons 510 are again actuated, to separate the heads 502 and 504 and orient the heads into the proper position over the mold conveyor 700. As seen from a comparison of FIG. 32 with FIG. 33, in this latter position the heads 502 and 504 fully support the lengths of strands 250 at the placement station 600, and the heads are arranged directly above the mold 100 between the open mold end assemblies 130 and 190 (FIGS. 33 and 34). With the use of the separate placement heads 502 and 504 the placement head assembly 500 will operate to fully support and accurately place reinforcing strands of various lengths.

After the mold 100 and the placement head assembly 500 are arranged at the placement station 600 in the above-described manner, the strand placement operation is continued by raising the mold 100 vertically into engagement with the placement head assembly 500, by raising the elevators 602 and 603 (FIG. 35). The positioning devices 660 and 680 on the elevator platforms 604 and 605 maintain the mold body 110 and the mold end assemblies 130 and 190 into the proper longitudinal position as such mold-lifting operation proceeds. Similarly, the brackets 612 engage with the mold body 110 and orient the mold 100 in the proper transverse position with respect to the placement head assembly 500 as the mold 100 is lifted. Thus, the mold end assemblies 130 and 190 are maintained in an open and "ready" position as the mold 100 is raised so that the placement head assembly 500 extends within the cavity of the mold between the open mold end assemblies (FIG. 37). Suitable stop means (not shown) stop the lifting action of the elevators 602 and 603 when the free ends of the reinforcing strands 250 in the placement head assembly 500 become longitudinally aligned with the strand-receiving apertures 146 and 196 on the mold end assemblies.

With the placement head assembly 500 positioned within the mold 100, as shown in FIGS. 35 and 37, the positioning means 660 and 680 on the elevator platforms 604 and 605 are then actuated to close the end assemblies 130 and 190 against the adjacent ends of the mold body 110. This closing of the mold end assemblies is accomplished by actuating the hydraulic push rods 684 to slide the placement heads 660 and 680, from an outward position (FIG. 35) to an inward position adjacent the mold body 110 (FIG. 36). At the same time that the push rods 684 are actuated, the pistons 510 on the placement head assembly 500 are also actuated to bring the placement heads 502 and 504 together, from the position shown in FIG. 35 to that shown in FIG. 36, so that the heads do not interfere with the mold end closing operation.

As illustrated in FIG. 39, the closing of the mold end assemblies 130 and 190 causes the free ends of the reinforcing strands 250 to project into the strand chucks 160 and 210. Since the end assemblies 130 and 190 are arranged in the above-described "ready" position, the strand chucks 160 and 210 will grip the strands 250 and secure the strands against inward movement with respect to the mold end assemblies.

By this operation, the reinforcing strands 250 are placed within the cavity of the mold 100 and secured in the proper position therein by the gripping action of the strand chucks 160 and 110. With the strand placement operation completed, the cylinders 526 on the placement heads 502 and 504 can be energized to move the actuating linkages 520 from a closed position (FIG. 37) to an open position (FIG. 40). The closure members 516 in the placement heads 502 and 504 are thereby retracted from the strand-receiving channels 514, and the reinforcing strands 250 are released from engagement with the placement head assembly 500. The elevators 602 and 603 can then lower the mold 100 from engagement with the strand placement head assembly 500, and again place the mold on the mold conveyor 700. The mold 100 is thus readied for moving to a tensioning station, where the strands 250 in the mold will be pretensioned to a predetermined level.

The strand placement operation is substantially similar when the strand placement station 600, including the head assembly 500, is employed to place reinforcing strand within the modified mold assembly 100', shown in FIGS. 24 and 25. Such strand placement is also carried out with the mold end assemblies of the mold 100' in the "ready" position. As illustrated in FIG. 24, the locking plate 230' is thus engaged with the intermediate recessed surface 226' in chuck plate 192', and the strand chucks 210' are activated for gripping the strands 250. In the embodiment illustrated in FIG. 24, the distance between the chuck plate bearing surfaces 224' and 226' is also 9/16", so the "ready" position for the end assembly 190' moves the chuck plate 200' an additional 9/16" outwardly from the adjacent mold end plate 192'.

The strand placement operation is also substantially similar when the strands 250 are emplaced in the modified mold 300, shown in FIG. 26. Again, during the strand placement operation the end assemblies 330 and 390 are adjusted into the "ready" position so that the chucks 360 and 410 are activated. In the specific illustrated embodiment, the distance between the surfaces 374 and 376 on the chuck plate 350, and between the surfaces 424 and 426 on the chuck plate 400, is 9/16", so that movement to the "ready" position spaces the chuck plates further outwardly by 9/16".

Moreover, the above-described strand placement operation is substantially the same if the modified placement head assembly 500A (FIGS. 54–56) is employed. The only variation in the operation with the head assembly 500A is that the strand gripping means 550 is deenergized and disengaged from the strands 250 throughout the feeding of the strands into the placement head 500A and the placement of the strands into the cavity of the mold 100. In this manner, the gripping means 550 does not interfere with the placement operation, but can be subsequently activated to grip the strands 250, and the placement head 504A translated to subject the strands to a slight pretensioning load, after the strands have been emplaced in the mold 100.

STRAND TENSIONING OPERATION

Force-measured tensioning

After the strand placement operation, the strands 250 emplaced within the mold 100 are tensioned to the desired pretensioning level before a concrete mixture is charged into the mold. In the illustrated embodiment for casting type E railway ties, the desired pretensioning level is approximately 100,000 pounds; or 25,000 pounds for each of the strands 250.

In accordance with one aspect of this invention, the strands 250 are accurately tensioned by measuring the amount of force applied thereto. To begin this force-measured tensioning operation, the mold body 100 is removed from the strand placement station 600 and carried, by means of the conveyor 700, to the force-measured tensioning station 800. As seen in FIGS. 42 and 44, as the mold 100 reaches the tensioning station 800, the ends of the mold become engaged with the elevator platforms 804 and 805. The platforms 804 and 805 are then raised to remove the mold from the conveyor 700, and the brackets 612 urge the mold in the proper transverse position on the platforms. Guide tracks 812 on the platforms position the mold 100 longitudinally and also maintain the mold end assemblies 130 and 190 in the "ready" position, by engaging the locking plate cam rollers 188 and 238. The mold 100 and the right mold end assembly 190 are thereby aligned with the strand tensioning head 820.

The tensioning head 820 is then moved, by means of the positioning cylinder 830, from an outward position (FIG. 44) to an inward position adjacent the end assembly 190 (FIG. 46). As a result, the tensioning chucks 826 on the head 820 engage with two of the reinforcing strands 250a, and the tensioning fork 824 abuts against the adjacent chuck plate 200, along the bearing surfaces 824a (FIG. 47). The hydraulic tensioning cylinders 822 are then actuated to pull the strands 250a against the grip of the chucks in the opposed end plate assembly 130, to thereby tension the strands. After the cylinders 822 subject the strands 250a to a tensioning force of the desired magnitude, the tensioning chucks 826 are released by suitable means (not shown), and the chucks 210 of the end assembly 190 seat against the strands 250a so that the pretensioning force on the strands is substantially maintained. In the illustrated embodiment for manufacturing railroad ties, the cylinders 822 are actuated to subject each of the strands 250a to a 25,000 pound pretensioning force.

The tensioning station 800 is preferably employed to tension only two of the reinforcing strands 250, as described above, since the required close spacing of the strands in the exemplary embodiment does not allow sufficient space for four individual cylinder-actuated tensioning devices to tension the four strands simultaneously. Such use of individual tensioning cylinders for each strand is preferred so as to provide uniformity of tension in the strands. Thus, in the preferred arrangement, the other two reinforcing strands 250b are tensioned at the tensioning station 800A, as illustrated in FIG. 43. The operation of the tensioning station 800A and the associated tensioning head is identical to the above-described operation, with the exception that the tensioning head engages with and tensions the strands 250B, as indicated schematically in FIG. 48.

This invention also includes means to accommodate for the slight loss of strand tension resulting from the seating of the chucks 210 with the strands 250 when the pull of the tensioning head 820 is released. To accomplish this, the mold 100 is conveyed from the tensioning station 800A to an elongation-measured tensioning station 800B. As seen in FIGS. 49 and 50–53, this tensioning station 800B also includes left elevator platforms 604 and 605 for engaging the mold 100 and lifting the mold from the conveyor 700. Again, the tracks 812 and brackets 612 at station 800B adjust the mold 100 into the proper position.

Station 800B differs from the above-described tensioning stations 800 and 800A by the provision of a modified tensioning head 900, as illustrated in FIGS. 49 and 50. In contrast to the tensioning head 820, the modified tensioning head 900 operates to tension all of the strands 250 simultaneously by measuring the elongation of the strands resulting from an applied tensioning force.

To accomplish such elongation-measured tensioning, the channel member 902 of the head 900 is engaged with the end plate 192 of the adjacent end assembly 190, along the bearing surfaces 902a (FIG. 51). In addition, the tensioning member 906 of the head 900 is engaged with the tensioning post 240 on chuck plate 200. The tensioning cylinder 910 is then energized to move the tensioning member 906 outwardly and thereby pull the chuck plate 200 outwardly from the adjacent end plate 192. Since the chucks 210 on the chuck plate 200 are in gripping engagement with the strands 250, such movement results in the tensioning and the elongation of the strands 250. The tensioning head 900 thus can be employed to apply an additional tension to the previous tension strands 250, to recover the tension loss caused by the seating of the chucks 210 at the tensioning stations 800 and 800A.

To preserve this additional tension in the strands 250, the locking plate 230 on the end assembly 190 is moved from the above-described "ready" position to an upward "locked" position by the actuation of the cylinder 920 and push rod 922 (FIG. 52). As seen in FIGS. 15 and 16, the movement of the locking plate 230 to the "locked" position brings the plate into engagement with the opposed faces of the chuck and end plates 200 and 192, respectively, by moving the locking plate from engagement with the recessed bearing surface 226. Accordingly, the adjacent chuck and end plates are spaced by an additional distance equal to the depth of the recessed surface 226.

It has been found that the seating of the chucks 210 will cause a loss of tension in No. 7 reinforcing wire (7/16" diameter) by permitting the wire to retract approximately .187 inch during the chuck seating, with a resulting tension loss of about 5700 pounds per strand. Accordingly, in the illustrated embodiment, the depth of the chuck plate recess 226 is selected to be .187 inch, to compensate for such tension loss.

Elongation-measured tensioning

In accordance with this invention, the tensioning station 800B also can be utilized to create the full tension load in the strands 250. To accomplish this, the strands 250 are emplaced in the modified mold 100', as shown in FIGS. 24 and 25. Such elongation-measured tensioning is made possible by the known direct relationship between a strand tensioning force and the resulting elongation of a particular type and size of reinforcing wire strand.

In this modified mold 100', the end assembly 190' is dimensioned so that the movement of the locking plate 230' from a "ready" position (FIG. 24) to a "locked" position (FIG. 25) spaces the chuck plate 200' from the end plate 192' by a predetermined distance. Thus, the depth of the chuck plate recess 226' is selected to equal the strand elongation which would result in the application of the desired strand tensioning force.

To describe the elongation-measured tensioning operation more specifically, the modified placement station 600A is used to place the strands 250 within the mold 100' in substantially the same manner as described above. However, after the strands are emplaced, the strand gripping means 550 (FIGS. 55 and 56) of the head 504A is energized to grip the right end of the strands. Then the head 504A is moved outwardly (rightward in FIG. 54) so that the gripping means 550 tensions the strands 250 against the resistance of the left end assembly chucks 150. The resulting initial strand tensioning, preferably on the order of a 1000 pounds, insures that the strands have been pulled straight and that the chucks on the end assemblies are seated properly on the strand.

The operation of the station 800B to tension the four strands 250 fully is substantially the same as described above. Thus, the tensioning head 820 is engaged with the end plate 192' and the chuck plate 200', and operates to separate the plates by a predetermined distance. Since the elongation of strand such as strand 250 is proportional to the tensioning force applied thereto, the resulting elongation of the strands provides a measure of the applied force. In the exemplary embodiment, the elongation measured-tensioning station 800B need not be adapted to compensate for tension loss from chuck seating, since the pretensioning load is applied to the strands through the chucks.

After the strands 250 have been elongated a predetermined distance, the locking plate 230' is moved upwardly, by means of the cylinder 920 (FIG. 52), from the "ready" position shown in FIG. 24 into the "locked" position shown in FIG. 25. By this adjustment, the locking plate 230' spaces the chuck plate 200 outwardly an additional distance equal to the depth of the recessed surface 226'. Thus, the depth of the recessed surface 226' is chosen to hold the strands 250 in an elongated condition which applies the desired pretensioning force to the strands. In the illustrated embodiment, adapted to tension each of the four strands 250 to a force level of 25,000 pounds, the desired force level in the strands is produced by elongating the strands (7/16 inch diameter) approximately .791 inch. Accordingly, the depth of the recessed surface 826' on the modified chuck plate 200' is .791 inch.

The modified mold 300, illustrated in FIG. 27, is adapted for use with either the force-measured or elongation-measured tensioning methods described above. To accomplish this, each of the end assemblies 330 and 390 are adjustable into three positions ("unlocked," "ready" and "locked"). In addition, the depth of the recessed surface 376 on the end assembly 330 is made larger than the corresponding depth of the recessed surface 426 on the end assembly 390. In the specific embodiment, the depth of surface 376 is .791 inch, whereas the depth of the surface 426 is .187 inch.

When the modified mold 300 is used in a force-measured strand tensioning operation, the end assembly 390 is employed as a three position assembly, having a "locked" position, and the other assembly 330 is employed as only a two position assembly ("unlocked" and "ready"). Thus, both assemblies can be adjusted from the unlocked to the ready positions, as described above, but only the right end assembly 390 will be further adjusted to a "locked" position. The assembly 390 thereby compensates for the loss of tension resulting from the seating of chucks 410 during the force-measured tensioning operation.

On the other hand, when the modified mold 300 is employed in an elongation-measured tensioning operation, the functions of the end assemblies 330 and 390 are reversed. Thus, the end assembly 390 is used as a two position assembly, and the assembly 330 is used as the three position assembly having a "locked" position. Accordingly, both end assemblies 330 and 390 again can be adjusted from an "unlocked" to a "ready" position, but only the end assembly 330 will be adjusted to a "locked" position. The end assembly 330 thus maintains the strand 250 at the desired tension level by locking the strands 250 in an elongated condition.

Although an embodiment constructed in accordance with the present invention has been described with the requisite particularity, the disclosure is of course only exemplary. Consequently, numerous changes in details

What is claimed is:

1. In a system for manufacturing prestressed concrete members, the combination of a portable mold and a head for placing reinforcing strand in said mold comprising:

an open-ended mold body defining an elongate mold cavity for receiving reinforcing strand and a charge of concrete mixture, said mold body including mold ends joined to said body with both ends longitudinally movable from an open position spaced from said body to a closed position against said body, said ends in said latter position defining the end portions of said mold cavity, said mold ends including a pattern of apertures for receiving the free ends of reinforcing strand fed from within said mold cavity, strand gripping means positioned on said mold ends adjacent each of said apertures and operable to releasably restrain the inward retraction of strand extended through said apertures, locking means on said mold ends arranged to cooperate with the gripping means to releasably lock a pretensioning load into said strand, a strand placement head spaced adjacent said mold in alignment with said elongate mold cavity, said head being operable to receive elongate reinforcing strand of a length exceeding the length of said mold body, said head being further operable to releasably suspend said length of reinforcing strand in alignment with said mold cavity in a pattern corresponding to said pattern of apertures in said mold ends, means for positioning said placement head within said mold cavity with both of said mold ends in said open position so as to align the suspended length of strand with the pattern of apertures in said mold ends, and means for closing both of said mold ends against said mold body to define the end portions of said mold cavity and to extend the free ends of said strand outwardly through said mold end apertures and into engagement with said gripping means, whereby said system is operable to place reinforcing strand within said mold cavity in said predetermined pattern and the engagement between said strand and said gripping means retains said mold ends engaged with said mold body.

2. The invention in accordance with claim 1 wherein said placement head is spaced above said mold and wherein said means to position said head within said mold cavity comprises an elevator operable to raise said mold toward said placement head.

3. The invention in accordance with claim 1 wherein said mold ends include adjustable control means operable to engage with said gripping means to selectively activate said gripping means for gripping said strand and to deactivate said gripping means so that said mold ends may be moved outwardly from said mold body.

4. The invention in accordance with claim 3 wherein said system includes a conveyor for carrying said body to said strand placement head and wherein said system includes means engageable with said strand gripping control means on said mold ends to activate said strand gripping means as said mold body is carried on said conveyor toward said strand placement head.

5. A portable molding apparatus for molding prestressed concrete members comprising:

a hollow mold body defining a mold cavity for receiving the concrete to be molded;

a mold end plate positioned adjacent each end of said mold body and having an inner side, said mold end plates including corresponding openings arranged in substantially longitudinal alignment to receive the end portions of a reinforcing strand extended longitudinally within said mold cavity;

an anchoring plate positioned adjacent the outer side of each of said mold end plates with the adjacent anchoring and end plates having opposing faces and being slidably joined by means permitting longitudinal movement of each of said anchoring plates with respect to the adjacent mold end plate;

strand gripping means positioned on said anchoring plates and engageable with the free end of reinforcing strand extended through said openings so that tension can be applied to the strand by extending said anchoring plates outwardly with respect to said mold end plates;

a locking plate mounted between adjacent anchoring and end plates and movable into engagement with said opposing faces thereof to releasably retain said anchoring plates a predetermined distance outwardly from the adjacent mold end plates and thereby maintain the wire strands in the mold under a predetermined tension; and cam means included on said locking plates for selectively moving said locking plates into engagement with said opposed faces of said adjacent anchoring and end plates.

6. A portable molding apparatus for molding prestressed concrete members comprising:

a hollow mold body defining a mold cavity for receiving the concrete to be molded;

a mold end plate positioned adjacent each end of said body and having an inner side, said end plates including corresponding openings arranged in alignment to receive reinforcing strand extended longitudinally within said mold cavity;

an anchoring plate positioned adjacent the outer side of said mold end plates with the adjacent anchoring and end plates defining opposing faces and being slidably joined for relative movement;

strand gripping means on said anchoring plates and engageable with the strand extended through the openings to apply tension to the strand by moving said anchoring plates outwardly with respect to said end plates;

releasing means engageable with said gripping means to release said gripping means from said strand with said anchoring plates in a first position with respect to the adjacent end plate, said gripping means being engageable with said strand with said anchoring plates in a second position with respect to the adjacent end plate; and a locking plate mounted for movement between adjacent anchoring and end plates in engagement with said opposed faces, said locking plate and opposed faces defining stepped abutment means selectively maintaining said anchoring plates in said first or second positions with respect to the adjacent end plate.

7. The invention in accordance with claim 6 wherein said abutment surface defined by the opposed faces of adjacent anchoring and end plates at one end of said mold is selectively engageable with said locking plate to maintain said anchoring plate in said first and second spaced positions and in a third position spaced outwardly from said second position, the spacing between said second and third positions being predetermined to elongate the strands sufficiently to compensate for strand tension losses created by the gripping of the strand by said strand chucks.

8. In a portable molding apparatus for molding prestressed concrete members including a hollow mold body, a mold end assembly for applying a pretensioning load to reinforcing strand within said body comprising:

a mold end plate positioned adjacent an end of said body and having openings to receive reinforcing strand emplaced within said body;

an anchoring plate positioned adjacent said end plate with said anchoring and end plates defining opposed surfaces;

means mounting said anchoring plate for sliding movement with respect to said end plate;

strand gripping means positioned on said anchoring plate and releasably enageable with strand extended through said openings to seat on said strand and apply a pretensioning load to the strand; and tension loss compensating means comprising a locking plate mounted for sliding movement between said anchoring and end plate in engagement with said opposed surfaces to space said anchoring plate from said end plate by a distance selected to compensate for a predetermined tension loss in the strand resulting from said seating of said gripping means on the strand.

9. In a portable molding apparatus for molding prestressed concrete members including a hollow mold body, the improvement comprising a mold end assembly for applying a pretensioning load to reinforcing strand within said body, said assembly comprising:

a mold end plate positioned adjacent an end of said body and having openings to receive reinforcing strand emplaced within said body;

an anchoring plate positioned adjacent said end plate with said anchoring and end plates defining opposed surfaces;

means mounting said anchoring plate for sliding movement with respect to said end plate;

strand gripping means positioned on said anchoring plate and releasably engageable with strand extended through said openings to apply a pretensioning load to the strand by sliding said anchoring plate with respect to said end plate; and a locking plate mounted for sliding movement between said anchoring and end plates in engagement with said opposed surfaces, said locking plate and opposed surfaces defining stepped abutment means which selectively spaces said anchoring plate with respect to said end plate into a first position which permits said gripping means to release said strand and a second position which applies a pretensioning load to the strand with the gripping means engaged with the strand.

10. A portable molding apparatus in accordance with claim 9 wherein said stepped abutment means further selectively maintains said anchoring plate in a third position spaced a predetermined distance from said second position, with said spacing between said second and third positions being selected to elongate the strands to compensate for the strand tension loss created by the engagement of said gripping means with the strand.

11. In a portable molding apparatus for molding prestressed concrete members including a hollow mold body, the improvement comprising a mold end assembly for applying a pretensioning load to reinforcing strand within said body, said assembly comprising:

a mold end plate movably mounted on said mold body for movement between an opened position spaced a predetermined distance from said body and a closed position adjacent said body and having openings to receive reinforcing strand emplaced within said body;

an anchoring plate positioned adjacent said end plate with said anchoring and end plates defining opposed surfaces;

means mounting said anchoring plate for sliding movement with respect to said end plate;

strand gripping means positioned on said anchoring plate and releasably engageable with strand extended through said openings to apply a pretensioning load to the strand by sliding said anchoring plate with respect to said end plate;

releasing means engageable with said gripping means to release said gripping means from said strand with said anchoring plate in a first position with respect to said end plate and permit the strand to be removed from the openings in said end plate by movement of said end plate from said closed to said opened position; said gripping means being engageable with said strand with said anchoring plate spaced in a second position with respect to said end plate; and a locking plate mounted for sliding movement between said anchoring and end plate and engageable with said opposed surfaces to releasably retain said anchoring plate spaced in said second position and thereby apply an external pretensioning load to the strand.

12. A portable molding apparatus in accordance with claim 11 including a pair of said movable mold end assemblies mounted in alignment at opposed ends of said mold body so as to receive opposite ends of a length of reinforcing strand emplaced within said body.

13. A portable molding apparatus in accordance with claim 12 wherein said locking plate and opposed surfaces define stepped abutment means which selectively spaces said anchoring plates in said first and second positions with respect to said end plates.

14. In a system for manufacturing prestressed concrete members, the combination of a portable mold and a tensioning head for pretensioning reinforcing strand emplaced in said mold comprising:

a mold body defining a mold cavity for receiving strand and a charge of concrete mixture;

a mold end assembly secured to said body for applying a pretensioning load to the strand comprising an end plate adjacent said body having an opening for receiving the free end of reinforcing strand fed outwardly from within said mold cavity, a movable anchoring plate slidably joined to said end plate, strand-gripping means on said anchoring plate engageable with the free end of the strand to restrain the strand from inward retraction through the opening in said end plate, and a locking plate having a predetermined width and slidably mounted on said end assembly for movement into a locking position between said end and anchoring plates to thereby space said anchoring plate a predetermined distance from said end plate;

preloading means to force the strand outwardly through said opening to remove the slack from the strand and engage the strand with said gripping means;

a movable tensioning head for applying a pretensioning load to the strand within the mold body including a bearing surface engageable with said end plate, pulling means engageable with said anchoring plate, and actuating means connected to said pulling means to apply a force to said pulling means with said bearing surface engaged with said end plate, said actuating means thereby spacing said anchoring plate a predetermined distance from said end plate and applying a pretensioning load to said strand through said gripping means: and locking means engaged with said locking plate to slide said locking plate into said locking position between said spaced end and anchoring plates and thereby maintain said pretensioning load in said strand.

15. In a system for manufacturing prestressed concrete members, the combination of a portable mold and a tensioning head for applying a measured pretensioning force to reinforcing strand emplaced in said mold comprising:

a mold body defining a mold cavity for receiving strand and a charge of concrete mixture;

a mold end assembly secured to said body for applying a pretensioning load to the strand comprising an end plate adjacent said body having an opening for receiving the free end of reinforcing strand fed outwardly from within said mold cavity, a movable anchoring plate slidably joined to said end plate, and strand-gripping means on said anchoring plate engageable with the free end of the strand to restrain the strand from inward retraction through the opening in said end plate;

a movable tensioning head for applying a measured pretensioning load to the strand within the mold body including a bearing surface engageable with said anchoring plate, pulling means engageable with the free end of the reinforcing strand, and actuating means connected to said pulling means to apply a measured force to said pulling means with said bearing surface engaged with said anchoring plate and thereby apply a measured pretensioning load to said strand through said strand gripping means; and compensating means to compensate for the loss of tension from seating of said strand-gripping means on said strand, said compensating means comprising a tensioning head including a bearing surface engageable with said end plate and means engageable with said anchoring plate for spacing said anchoring plate a predetermined distance outwardly with respect to said end plate and locking means movable into engagement between said anchoring and end plates and having a selected width which maintains said plates spaced by a distance which compensates for the tension loss from the seating of said gripping means on the strand.

References Cited

UNITED STATES PATENTS

| | | | |
|---|---|---|---|
| 2,153,741 | 4/1939 | Cobi | 25—118X |
| 2,394,227 | 2/1946 | Barber | 25—118 |
| 3,118,211 | 1/1964 | Baber | 25—118 |
| 3,128,521 | 4/1964 | Baker | 25—118X |
| 3,163,904 | 1/1965 | Ziolkowski | 24—126 |
| 3,194,536 | 7/1965 | Simms | 254—29 |
| 3,207,829 | 9/1965 | Nieber | 264—228 |
| 3,281,911 | 11/1966 | Baker | 25—118 |
| 3,305,907 | 2/1967 | Baker | 25—2 |

J. SPENCER OVERHOLSER, Primary Examiner

B. D. TOBOR, Assistant Examiner

U.S. Cl. X.R.

25—118; 249—86; 264—228